US012623915B2

(12) United States Patent
Khaskia et al.

(10) Patent No.: US 12,623,915 B2
(45) Date of Patent: May 12, 2026

(54) COLLOIDAL FLOW-GATE

(71) Applicant: Technion Research & Development Foundation Limited, Haifa (IL)

(72) Inventors: Mais Khaskia, Haifa (IL); Ofer Manor, Haifa (IL); Oz M. Gazit, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 642 days.

(21) Appl. No.: 18/109,939

(22) Filed: Feb. 15, 2023

(65) Prior Publication Data

US 2023/0264968 A1     Aug. 24, 2023

Related U.S. Application Data

(60) Provisional application No. 63/311,474, filed on Feb. 18, 2022.

(51) Int. Cl.
*C01F 7/308* (2022.01)

(52) U.S. Cl.
CPC .......... *C01F 7/308* (2013.01); *C01P 2004/60* (2013.01); *C01P 2006/90* (2013.01)

(58) Field of Classification Search
None
See application file for complete search history.

(56) References Cited

U.S. PATENT DOCUMENTS 4,439,062 A * 3/1984 Kingsbury .............. E02D 31/00
588/259

FOREIGN PATENT DOCUMENTS

WO    WO-2021154905 A1 * 8/2021 ........ B01J 20/28059

OTHER PUBLICATIONS

Tombácz, E., et al. The pH-dependent colloidal stability of aqueous montmorillonite suspensions. Colloids and Surfaces, 49 (1990) 71-80. (Year: 1990).*
Norrfors, K. K., et al. Montmorillonite colloids: I. Characterization and stability of dispersions with different size fractions. Applied Clay Science 114 (2015) 179-189. (Year: 2015).*
Chitale, D. V., et al. NMR characterization of the water adsorbed by montmorillonite: Impact on the analysis of porosity logs. Society of Petroleum Engineers, SPE/AAPG Western Regional Meeting held in Long Beach, California, Jun. 19-23, 2000. (Year: 2000).*
De Vargas Brião et al. "Reusable and Efficient Clay Material for the Fixed-Bed Neodymium Recovery", Sustainable Chemistry and Pharmacy, 25: 100623-1-100623-14, Apr. 1, 2022.

(Continued)

*Primary Examiner* — Anthony J Zimmer
*Assistant Examiner* — Zachary John Baum

(57) ABSTRACT

The present invention provides a flow-gate design that utilizes chemo-responsive colloidal particles to control the flow rate therethrough. The flow-gate operates by changing the compactness of the colloidal particles, which changes in response to changes in pH or ionic strength in the flow medium or the surrounding environment. The design also allows the flow-gate as a size-discriminating filter. The ability to control the flow rate in response to changes in the flow medium or the environment makes the presently provided flow-gate useful for a variety of applications, including those that require automatic control of the flow rate, and automatic irrigation.

15 Claims, 18 Drawing Sheets

(56) References Cited

OTHER PUBLICATIONS

Geetanjali et al. "Layered Double Hydroxides: A Brief Review from Fundamentals to Application as Evolving Biomaterials", Applied Clay Science, 153: 172-186, Mar. 1, 2018.

Khalfa et al. "A Calcined Clay Fixed Bed Adsorption Studies for the Removal of Heavy Metals From Aqueous Solutions", Journal of Cleaner Production, 278: 123935-1-123935-10, Available Online Aug. 31, 2020.

Khaskia et al. "First-Principle Colloidal Gate for Controlling Liquid and Molecule Flow Using 2D Claylike Nanoparticles", ACS Applied Materials & Interfaces, 14(28): 32657-32664, Published Online Jul. 5, 2022.

Kuo et al. "Controlling Mass Transport in Microfluidic Devices", Annual Review of Analytical Chemistry, 4: 275-296, First Published Mar. 29, 2011.

Prakash et al. "Bio-Polymer Modified Layered Double Hydroxide Extrudates: A Novel Approach Towards Adsorptive Purification of Water", Journal of Water Process Engineering, 35: 101208-1-101208-8, Jun. 1, 2020.

Yang et al. "In Situ Nano-Assembly of Mg/Al LDH Embedded on Phosphorylated Cellulose Microspheres for Tetracycline Hydrochloride Removal", Cellulose, 28: 301-316, Published Online Nov. 1, 2020.

* cited by examiner

FIG. 15

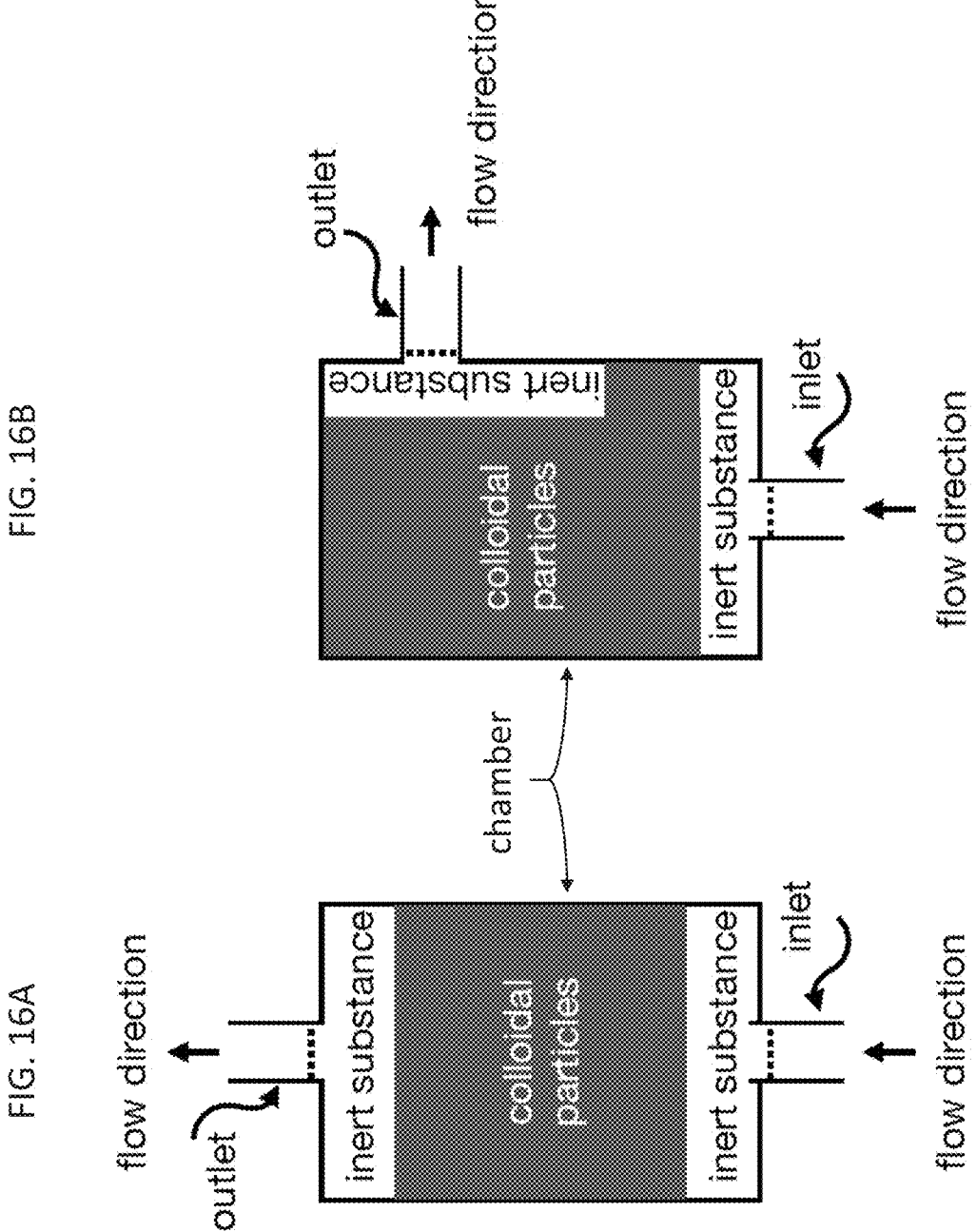

COLLOIDAL FLOW-GATE

RELATED APPLICATIONS

This application claims the benefit of priority of U.S. Provisional Patent Application No. 63/311,474 filed on Feb. 18, 2022, the contents of which are incorporated herein by reference in their entirety.

FIELD AND BACKGROUND OF THE INVENTION

The present invention, in some embodiments thereof, relates to hydrodynamics, and more particularly, but not exclusively, to colloidal particle-based flow-gates.

Flow-gates for controlling fluid mass transport are common both in technology and nature. Technological applications usually make use of mechanical valves, which respond to human or controller signals. While such valves are common in macro-applications in domestic and industrial utilities, similar applications are found on microfluidic platforms. Applications in the micro- and nanoscale domain typically employ electrokinetic and magnetic gates for arresting flow.

Colloidal particles are tiny particles, usually measuring between 1 and 1000 nanometers in diameter, that are suspended in a fluid. These particles can be naturally occurring (clay) or man-made, and are made of a wide variety of materials, including minerals, metals, polymers, glass and ceramics.

Flow systems comprising colloidal particles utilize the properties of colloidal particles to control the flow of fluids. One way that colloidal particles can be used in flow systems is by using them to create stationary porous structures that can be used to control the flow of fluids and as filters. For example, a colloid of particles can be poured into a mold and allowed to solidify or be sintered. The resulting rigid structure will have a network of pores that are of the same size or close to the dimensions of the colloidal particles. The pore size can be adjusted by changing the size and/or size distribution and/or the amount of the colloidal particles, allowing for fine control over the flow rate of fluids through the structure, however, the structure is fixed once the colloidal particles are fused or otherwise solidified. However, the use of colloidal particles in flow gates can have some limitations, such as the potential for particle sedimentation, clogging or instability of the structure, which can affect the performance of the flow system over time.

WO2016025873A1 provides a granular filtration media comprising a mixture of granular filtration media and less than 5% of nanofibers based on the dry weight, method of making the same and uses of the same for removing contaminants from water, including metals, heavy metals, synthetic or natural organic matters, colloidal or suspended particles to improve the chemical safety and purity of water for the purpose of water purification, specifically, one embodiment of the present invention disclosed is use of the granular filtration media to remove particulate lead from high pH water.

Khalfa, K. et al. [*"A calcined clay fixed bed adsorption studies for the removal of heavy metals from aqueous solutions"*, Journal of Cleaner Production, 2021, 278, 123935] presented a study evaluating applicability of a calcined clay from southern Tunisia, in a fixed bed adsorption of metal pollutants, in treatment of metal loaded effluents.

Giani de Vargas Brião et al. [*"Reusable and efficient clay material for the fixed-bed neodymium recovery"*, Sustainable Chemistry and Pharmacy, 2022, 25, 100623] reported the recuperate of neodymium from aqueous solutions through dynamic adsorption in a fixed-bed of expanded vermiculite (a natural clay mineral).

Yang, C. et al. [*"In situ nano-assembly of Mg/Al LDH embedded on phosphorylated cellulose microspheres for tetracycline hydrochloride removal"*, Cellulose, 2020, 28, 301-316] reported an in-situ nano-assembly method that provided improved adsorption of soluble Mg/Al LDH load without compromising the porous structure of CMs, making Mg/Al LDH@PCMs suitable for water treatment.

Prakash, R. et al. [*"Bio-polymer modified layered double hydroxide extrudates: A novel approach towards adsorptive purification of water"*, Journal of Water Process Engineering, 2020, 35, 101208] reported the preparation of modified LDH extrudates by one-pot co-precipitation and extrusion methods for column-based water and wastewater purification.

SUMMARY OF THE INVENTION

The present disclosure provides a technology that can be exploited, for example, to construct colloidal particles-based flow-gates. The flow-gates provided herein use the rapid response of colloidal particles to chemical changes in their environment, which is expressed in drastic changes in their through-flow capacity. This responsiveness is harnessed to control the flow of fluids through the flow-gate. For example, colloidal particles that are sensitive to changes in pH are used, according to some embodiments of the present invention, to create a flow gate that responds to changes in the acidity/alkalinity of the flow fluid and/or the immediate environment. Similarly, colloidal particles that are sensitive to changes in temperature can be used to create a flow gate that responds to changes in temperature. Flow-gates comprising chemo-responsive colloidal particles as provided herein have several advantages over traditional flow gates. They are highly responsive to changes in the environment, they are easy to fabricate, and they can be made of a wide variety of cheap and readily available materials. Additionally, they can be used to create structures with high surface to volume ratios which is ideal for certain high throughput applications.

The disclosure provides a general methodology that can harness the natural tendency of two-dimensional (2D) clay nanoparticles to self-assemble and restrict water permeability in soils to fabricate a synthetic, pH activated, reversible, and tunable colloidal flow-gate. To realize this methodology, the present inventors first studied the effect of pH level of a suspension of colloidal particles, e.g., clay-like layered double hydroxide (LDH) nanoparticles on the LDH coagulation process. The present inventors then packed the LDH into a fixed-bed column and examined the effect of pH on mass transport through the column. The present inventors have found that the 2D plate-like LDH particles coagulate in an edge-to-edge configuration, which renders highly non-isotropic aggregates, pivotal for obstructing the transport of liquid and molecules therein. The present inventors showed that the coagulation and flow through the column may be regulated by imposing various pH levels as a stimulus to affect LDH zeta potential. It was found that large zeta potential values support the presence of detached particles and small aggregates, exhibiting an open-state flow-gate with a minimum flow inhibition. It was further found that small zeta potential values near and below the LDH point of zero charge support the coagulation of the particles, which in-turn inflicts flow blockage, to a greater extent than in the case of large zeta potential.

Hence, this disclosure demonstrates that the flow through a column comprised of a 2D colloidal particles bed can be regulated in a reversible manner by modulating the pH of the wash solution, equilibration time, or gate dimensions. Furthermore, the present inventors have shown that subject to pH treatment, one may open and close the colloidal gate for the transport of large molecules and provide selective transport rates thereof.

Thus, according to an aspect of some embodiments of the present disclosure, there is provided a flow-gate that includes at least one flow-chamber in-line (in communication) with at least one inlet and at least one outlet, and a colloid of chemo-responsive colloidal particles contained in said flow-chamber, wherein said chemo-responsive colloidal particles are characterized by having a Brucite-like structure, and by forming fluid-impermeable aggregates in response to a change in a concentration of at least one solute in said colloid.

In some embodiments, the chemo-responsive colloidal particles have a general Formula I:

$$[M_{(1-x)}^{2+}M_x^{3+}(OH)_2]^{x+}[A^{n-}]_{x/n} \qquad \text{Formula I}$$

wherein:

$M^{2+}$ is a divalent metal ion, $M^{3+}$ is a trivalent metal ion, x is a molar ratio $$\frac{M^{2+}}{(M^{2+} + M^{3+})}$$

raging 0.2-0.33, $A^{n-}$ is an interlayer monoatomic or polyatomic anion, n is an integer ranging 1-3, and the chemo-responsive colloidal particles are characterized by forming fluid-impermeable aggregates in response to a change in a concentration of at least one solute in the colloid.

In some embodiments, $M^{2+}$ is selected from the group consisting of $Mg^{2+}$, $Cd^{2+}$, $Co^{2+}$, $Cr^{2+}$, $Cu^{2+}$, $Fe^{2+}$, $Hg^{2+}$, $Mn^{2+}$, $Ni^{2+}$, $Pb^{2+}$, and $Zn^{2+}$.

In some embodiments, $M^{3+}$ is selected from the group consisting of $Al_{3+}$, $Cr^{3+}$, $Dy^{3+}$, $Er^{3+}$, $Eu^{3+}$, $Fe^{3+}$, $Gd^{3+}$, $Ho^{3+}$, $La^{3+}$, $Lu^{3+}$, $Mn^{3+}$, $Nd^{3+}$, $Pr^{3+}$, $Sc^{3+}$, $Sm^{3+}$, $Tb^{3+}$, $Tm^{3+}$, $Y^{3+}$, and $Yb^{3+}$.

In some embodiments, $A^{n-}$ is selected from the group consisting of a halide ion, $OH^-$, $NO_3^-$, $NO_2^-$, $CO_3^{2-}$, $SO_4^{2-}$, $SO_3^{2-}$ and $PO_4^{3-}$.

In some embodiments, the size of the chemo-responsive colloidal particles ranges 0.1-1000 μm.

In some embodiments, the chemo-responsive colloidal particles have a broad particle size distribution.

In some embodiments, the chemo-responsive colloidal particles exhibit a broad particle size distribution, such that no single size bin represents more than 30% of the total particle population, and the size range spans at least two orders of magnitude.

In some embodiments, the flow-gate provided herein includes at least one flow-permeable barrier positioned between the flow-chamber and the outlet.

In some embodiments, the amount of the chemo-responsive colloidal particles in the flow-chamber ranges at least 0.1-1 grams per 1 $cm^2$ of cross-sectional area of the flow-chamber. In some embodiments, the amount of the chemo-responsive colloidal particles in the flow-chamber is at least 0.1 gram/$cm^2$, at least 0.25 gram/$cm^2$, at least 0.5 gram/$cm^2$, at least 1 gram/$cm^2$, or at least 2 gram/$cm^2$.

In some embodiments, the flow-chamber further includes a semi-permeable opening in communication (in intimate contact) with the colloid and with an aqueous medium in an environment outside the flow-gate, wherein the semi-permeable opening is impervious to the chemo-responsive colloidal particles and permeable to at least one solute in the aqueous medium.

In some embodiments, the solute is selected from the group consisting of hydronium ion (a hydrated proton), a monovalent cation, a divalent cation, a trivalent cation, a monovalent anion, a divalent anion, a trivalent anion, or any combination thereof.

In some embodiments, the chemo-responsive colloidal particles are pH-responsive colloidal particles.

In some embodiments, the chemo-responsive colloidal particles are ionic-responsive colloidal particles.

According to another aspect of some embodiments of the present invention, there is provided a flow system the includes at least one flow-gate as provided herein.

In some embodiments, the chemo-responsive colloidal particles includes pH-responsive colloidal particles, and the system is configured to allow a flow of a fluid exhibiting at least a pH at which aggregates of the pH-responsive colloidal particles disassemble.

In some embodiments, the chemo-responsive colloidal particles includes ionic-responsive colloidal particles, and the system is configured to allow a flow of a fluid exhibiting at least an ionic strength at which aggregates of the ionic-responsive colloidal particles disassemble.

According to another aspect of some embodiments of the present invention, there is provided a flow system includes at least one flow-gate having at least one semi-permeable opening.

In some embodiments, the chemo-responsive colloidal particles includes pH-responsive colloidal particles, and the system is configured to allow a flow therethrough upon a change in a pH level in the aqueous medium in the environment, wherein the pH level in the aqueous medium is at least a pH at which aggregates of the pH-responsive colloidal particles disassemble.

In some embodiments, the chemo-responsive colloidal particles includes ionic-responsive colloidal particles, and the system is configured to allow a flow therethrough upon a change in an ionic strength level in the aqueous medium in the environment, wherein the ionic strength level in the aqueous medium is at least an ionic strength at which aggregates of the ionic-responsive colloidal particles disassemble.

Alternatively, according embodiments of some aspects of the present invention, there is provided a flow-gate that includes a column and a bed of colloidal particles filling at least a portion of the column across the cross-section of the column, configured to allow or arrest a flow of a liquid therethrough by adjusting at least one chemical property of the liquid, essentially as described herein.

In some embodiments, the colloidal particles include layered double hydroxide (LDH) nanoparticles.

According to another aspect of some embodiments of the present disclosure, there is provided a device for controlling a flow rate of a liquid, which includes:

a conduit for channeling the liquid;

a mean for adjusting at least one chemical property of the liquid in the conduit; and the flow-gate as described herein, in fluid communication with the conduit through which the liquid is flowable at a controllable flow rate;

the device is configured essentially as described herein.

In some embodiments, the device is essentially as illustrated in the figures.

According to another aspect of some embodiments of the present disclosure, there is provided a method for controlling the flow of a liquid in the device described herein, the method effected by:

adjusting the chemical property of the liquid in the conduit, wherein the chemical property affects the bed essentially as described herein.

In some embodiments, the chemical property is a pH level of the liquid.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the phrases "substantially devoid of" and/or "essentially devoid of" in the context of a certain substance, refer to a composition that is totally devoid of this substance or includes less than about 5, 1, 0.5 or 0.1 percent of the substance by total weight or volume of the composition. Alternatively, the phrases "substantially devoid of" and/or "essentially devoid of" in the context of a process, a method, a property or a characteristic, refer to a process, a composition, a structure or an article that is totally devoid of a certain process/method step, or a certain property or a certain characteristic, or a process/method wherein the certain process/method step is effected at less than about 5, 1, 0.5 or 0.1 percent compared to a given standard process/method, or property or a characteristic characterized by less than about 5, 1, 0.5 or 0.1 percent of the property or a characteristic, compared to a given standard.

When applied to an original property, or a desired property, or an afforded property of an object or a composition, the term "substantially maintaining", as used herein, means that the property has not change by more than 20%, 10% or more than 5% in the processed object or composition.

The term "exemplary" is used herein to mean "serving as an example, instance or illustration". Any embodiment described as "exemplary" is not necessarily to be construed as preferred or advantageous over other embodiments and/or to exclude the incorporation of features from other embodiments.

The words "optionally" or "alternatively" are used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the terms "process" and "method" refer to manners, means, techniques and procedures for accomplishing a given task including, but not limited to, those manners, means, techniques and procedures either known to, or readily developed from known manners, means, techniques and procedures by practitioners of the chemical, material, mechanical, computational and digital arts.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying figures. With specific reference now to the figures in detail, it is stressed that the particulars shown are by way of example and for purposes of illustrative discussion of embodiments of the invention. In this regard, the description taken with the figures makes apparent to those skilled in the art how embodiments of the invention may be practiced.

In the figures:

FIGS. 14A-C present various characterizations of pH-controlled dye elution, wherein FIG. 14A shows the absorbance spectra ethanol eluted mixed solution of fluorescein (FC) and thionine (TH), FIG. 14B shows the cumulative fraction of FC and TH as a function of elution fraction, and FIG. 14C is a color photograph of columns pH and pH 12.8 showing the difference in flow of the dyes through the column;

FIG. 15 presents a schematic illustration of a device comprising a flow-gate based on colloidal particles, according to some embodiments of the present disclosure, which opens and closed based on an external stimulus (trigger) such as pH change; and FIGS. 16A-D present schematic illustrations of a few exemplary devices comprising a flow-gate, according to some embodiments of the present invention, positioned inline that opens and closed based on a specific property (trigger) of the flown liquid such as pH change.

DESCRIPTION OF SPECIFIC EMBODIMENTS OF THE INVENTION

Figure 1:
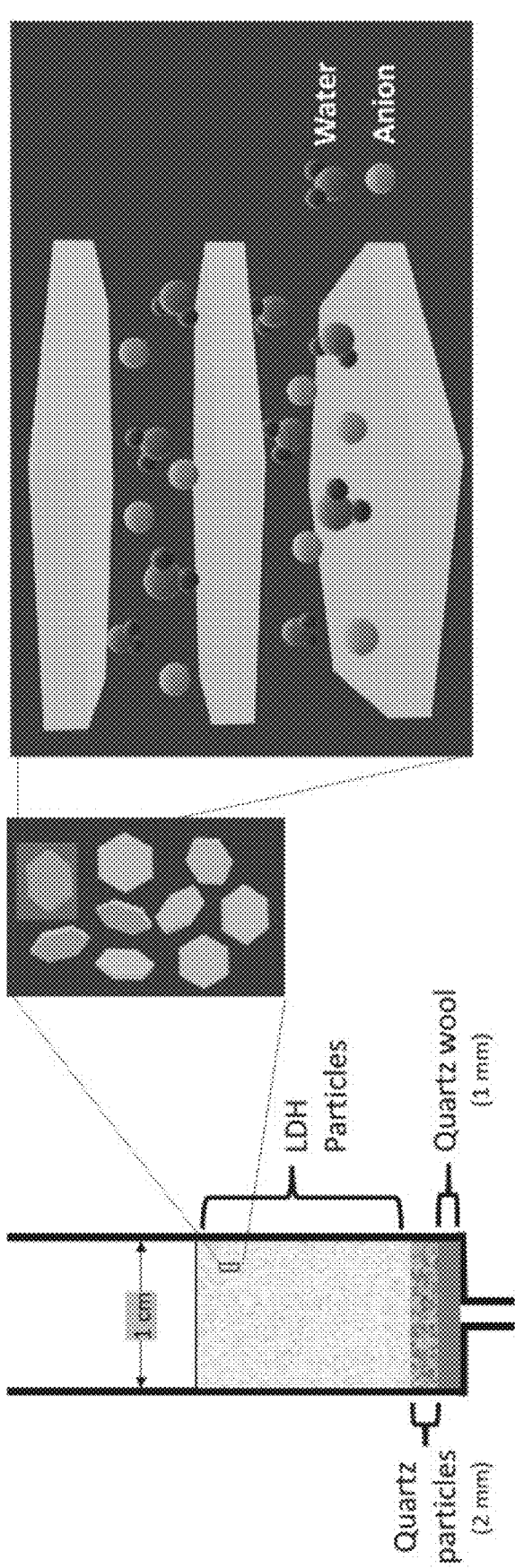
FIG. 1 presents a schematic illustration of an exemplary flow-gate, according to some embodiments of the present invention, wherein quartz particles replaced the LDH particles were in the control experiment.

The present invention, in some embodiments thereof, relates to hydrodynamics, and more particularly, but not exclusively, to colloidal particle-based flow-gates.

Before explaining at least one embodiment of the invention in detail, it is to be understood that the invention is not necessarily limited in its application to the details set forth in the following description or exemplified by the Examples. The disclosure is meant to encompass other embodiments or of being practiced or carried out in various ways.

As discussed hereinabove, flow-gates are commonly used in various industrial and laboratory applications for controlling the flow of fluids through a system. However, traditional flow-gates often rely on mechanical means for flow control, which can be unreliable and prone to failure. Inspired by the natural phenomena of flash-floods in arid areas, the present inventors studies the unique composition of desert soil, and in particular, the elements in the soil that cause it to almost completely seal the top soil to water absorption deeper into the ground. The objective of this study was to identify soil elements that can be used controllably in colloidal flow-gates, such that the flow of a fluid can be controlled by controlling the state of the soil elements. Further investigation led to the identification of particular constituents of clay particles that have a particular chemical composition and particular morphology (structure).

Examples of natural colloidal flow-gates are the self-assembly of natural clays in Loess soils to reduce the permeability of water into the sub-surface, forcing rainfall water to runoff and create floods, and the coagulation of blood when exposed to air. In particular, the self-assembly of clay is triggered under specific pH regimes in the soil.

While conceiving the present invention, the present inventors considered that a 2D-particle structure or any non-isotropic geometry of clay particles provides unique properties that are advantageous for arresting flow as compared to more spherical particles like quartz (an oxide), which can also be found in soils.

Clay and clay-like materials are a class of two-dimensional nanoparticles that have attracted considerable attention with respect to their ability to act as ion exchange materials, drug delivery agents, adsorption materials, and catalysts. In aqueous solutions pH levels govern the surface charge of particles and thus their rate of coagulation. The energy barrier for particle coagulation is determined by a combination of the surface charge induced electrical double layer force between the particles (usually repulsive), the van der Waals, hydrophobic/hydrophilic forces, molecular ligands and chemically or physically adsorbed polymers to the surface of the particle, and polymer chains which perturb off the surface of a polymer-based particle. Moreover, while the self-assembly and stability of spherical colloids in solution is reasonably well understood both experimentally and theoretically, the picture is not clear in the case of dispersions of clay-like solutions.

While reducing the present invention to practice, the present inventors have harnessed the coagulation properties of dispersions of layered double hydroxides, or LHD particles, and specifically the exemplary nanoparticles (NPs) magnesium (Mg)-aluminum (Al)-LDH, to realize a colloidal gate for mass transport. The present inventors demonstrated the effect of pH on the coagulation kinetics of LDH particles, the reversibility of LDH surface charge, LDH coagulation level in the presence of shear flow, and the geometry of aggregates of the LDH particles. The present inventors have demonstrated a first principal pH stimulated flow-gate to control the flow speed of water or ethanol (EtOH) through a stationary bed of LDH.

Hence, aspects of the present invention are drawn to flow-gate devices that include colloidal particles, the unique properties of which is harnesses allow and restrict the flow liquid reversibly as a result of changes in the chemistry of the flowing liquid or an external chemical stimulus.

Specifically, the present invention provides a methodology that employs the natural property of colloidal particles and demonstrates that some colloidal particles, and in particular clay and clay-like colloidal particles may be controllably induced to assemble in flow-blocking (closed) states in response to pH, temperature, or solute stimuli. The purpose of the herein-provided colloidal flow-gate is to control the flow and fluid mass transport through the gate for any macroscopic to nanoscopic purpose, where on the macroscopic level one envisions the use of colloidal gates for agricultural and gardening purposes. The herein-provided flow-gates are useful in other applications, such as the field of microfluidics and nanofluidics, where by relaying on the self-assembly of colloidal particles, such embodiment may be used to control flow and mass transport in microfluidic and nanofluidic devices for medical as well as chemical and physical analysis purposes.

A Flow-Gate:

According to an aspect of some embodiments of the present invention, there is provided a flow-gate, which includes an inlet and an outlet, at least one flow-chamber, and a colloid or a slurry of chemo-responsive colloidal particles filling at least a portion of the flow-chamber such that any path between the inlet and the outlet crosses through the colloid in the flow-chamber. The flow-chamber is essentially a container for the chemo-responsive colloidal particles equipped with at least two apertures, at least one for letting a fluid to enter the flow-chamber and at least one to let the fluid out of the flow-camber; hence, the flow-chamber is the location where the fluid comes in contact with the particles. This configuration encompasses several mechanical configurations, including the most common form of a flow column, such as used for ion-exchange column and chromatography, but which a critical difference—the chemo-responsive colloidal particles are sensitive to the concentration of some solutes in the flow medium (liquid), and respond to an increase/decrease in said concentration by clumping into aggregates that essentially block the through-flow of the liquid reversibly, namely a reversal of the change in concentration will cause the aggregates of particles to break-up or change their morphology, thereby releasing the through-flow of the liquid. The device can be described as having a range of flow states, ranging from "closed" to "open", and any intermediate flow state therebetween, and the shift from one state on the range to another, is effected by changing the chemistry of the fluid that comes into contact with the particles. In some embodiments of the present invention, the flow-gate has only two discrete states, open and closed.

The definition of an "open" and a "closed" state correlates to the desired flow-rate, whereas in the "open" state the colloidal particles are loosely packed and allow fluid to flow therethrough, and in the "closed" state the colloidal particles aggregate and form fluid-impermeable aggregates that stop the through-flow. The maximal flow-rate depends on the inherent output of the flow system, which the flow-gate is a part of, and the desired flow-rate ranges from the maximal flow-rate that the flow-gate is capable of outputting ("open" state), to essentially no flow ("closed" state).

As used herein, the term "flow-gate" refers to a device that controls the flow of fluids through a conduit, pipe or a channel. It is a mechanism used to regulate the flow-rate, or the amount of fluid that can pass through a given area, and can be used to control the flow rate, pressure, or direction of the fluid. In general, flow-gates can be either manual or automatic, and are often used in industrial, irrigation, or water treatment applications. Flow-gates can be made of various materials such as metal or plastic, and include, or form a part of taps, valves, and faucets. In the context of the present invention, the term "flow-gate" is used to refer to device or a part in a device that controls the flow of a liquid, and acts as a flow control valve.

As used herein, the term "flow-chamber" refers to a part of the presently provided flow-gate, though which the fluid passes, and the location of the chemo-responsive colloid particles are contained in a hydrated state of a colloid or a slurry. Hence, the flow-chamber is where the flow rate is controlled, since the flow rate is determined by the aggregative state of the chemo-responsive colloid particles.

The flow-chamber's cross-section can have any shape, namely a round/circular cross-section as of a standard tubing/hose, or oval, or rectangular. The configuration of the chamber in terms of shape and size, as well as its area of the cross-section, have an effect on the flow-rate through the flow-gate, however, the "open" and "close" states on the flow-gate are determined by the flow-rate through the plurality of chemo-responsive colloidal particles, wherein the maximal flow-rate is observed at chemical conditions that maximally loosen the aggregative state of the particles, and the minimal flow-rate is achieved when the particles clump together to an impervious aggregative state. The flow-chamber is designed to contain the chemo-responsive colloidal particles in an amount sufficient to confer the "closed" and "open" states under a pressure that corresponds to the desired flow-rate. The selected amount of chemo-responsive colloidal particles is held inside the flow-chamber by means of flow-permeable barriers.

The flow-chamber is flanked by one or two flow-permeable barriers, which constitute one or two of the chamber's opposite walls. The flow-permeable barriers are typically made from an inert substance that can be used to restrict the movement of the particles while essentially not restricting the flow of the fluid and not interact chemically of mechanically with the colloidal particles, the flow-gate materials, or the fluid. The flow-permeable barriers, or particle filters, are typically made form synthetic polymeric fibers, wool, cotton or glass wool, as well as sintered glass or ceramic frit, all designed to hold the chemo-responsive colloidal particles from exiting the flow-chamber when the fluid flows therethrough. In some embodiments, the flow-gate is used in an upright position, and has only one (bottom) flow-permeable barrier whereas the top is redundant due to pravity keeping the particles at the bottom pf the flow-chamber. In some embodiments, the flow-chamber is flanked by a top and a bottom flow-permeable barriers, the position of which restrict the volume of the flow-chamber.

Figures 16C, 16D:
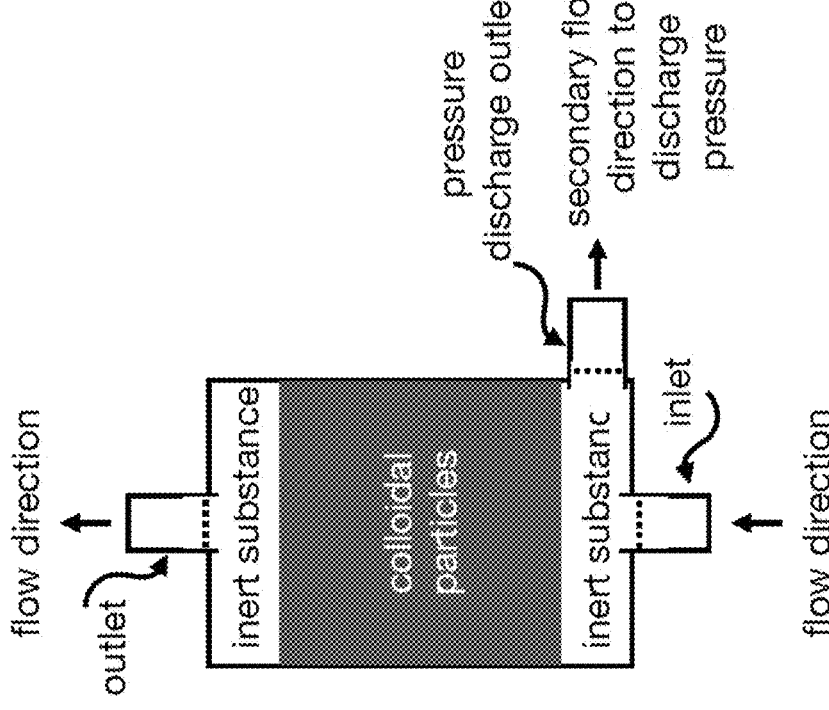

Reference is made to FIG. 16A, that presents a schematic illustration of an embodiment of the present invention, in the form of a simple flow-gate device, having a column-like configuration which includes a flow-chamber, and inlet and an outlet, and a colloid of chemo-responsive colloidal particles disposed inside the flow-chamber between two flow-permeable barriers made from an inert substance and designed to keep the particles inside the flow-chamber.

Chemo-Responsive Colloidal Particles:

The concept underlying the present invention is the propensity of chemo-responsive colloidal particles to form fluid-impermeable aggregates in response to a change in a concentration of at least one solute in the medium they are suspended in, namely their colloid. Embodiments of the present invention provide a flow-gate which is essentially devoid of an electronic sensor, a computerized controller, a mechanical valve, or a power source.

The concept underlying the present invention has been demonstrated, as presented in the Examples section that follows, using a colloid of layered double hydroxides mineral particles, a class of synthetic clays, as chemo-responsive colloidal particles. Layered double hydroxides (LDH) are lamellar inorganic solids characterized by a brucite-like structure, similar to that of hydrotalcite, where the partial substitution of trivalent for divalent cations results in a positive sheet charge, compensated by anions situated in the interlayer galleries. "Brucite-like structure", as this term is used in the art, refers to the substances exhibiting the structure of the mineral form of Brucite, or $Mg(OH)_2$, which exhibits octahedral coordination around the metal ions. In brucite-like structures the divalent metal ions, $M^{2+}$, may be substituted with trivalent ones ($M^{3+}$) of similar coordination properties. This isomorphous substitution results in positively charged sheets, which are neutralized by interlayer anions ($A^{n-}$), typically carbonates, nitrates and hydroxides. Water molecules also reside between the layers.

Non-limiting examples of layered double hydroxide mineral characterized by a Brucite-like structure include Antigorite (Mg3Si2O5(OH)4), Augelite (Al2Si3O10(OH)2), Chloromagnesite (Mg5(CO3)4Cl2), Clorothionite (MgCl2O2), Fayalite (Fe2SiO4), Halloysite (Al2Si2O5 (OH)4), Hétérolite (Mg5(Si8O2O)(OH)2·8H2O), Hydrotalcite (Mg6Al2(CO3)(OH)16·4H2O), Hydromagnesite (Mg5 (CO3)4(OH)2·4H2O), Lizardite (Mg3(Si2O5)(OH)4), Magnesiowüstite (MgO), Magnesite (MgCO3), Montmorillonite (Al2Si4O10(OH)2·nH2O), Nesquehonite (MgCO3·3H2O), Okenite (CaSiO3·nH2O), Pyroaurite (Ni3 (PO4)2), Saponite (Al2Si4O10(OH)2·nH2O), Serpentine (Mg3Si2O5(OH)4), Talc (Mg3Si4O10(OH)2), Triphylite (LiFe2(PO4)3), and Vivianite (Fe2(PO4)2·8H2O)

LDH layered structure can be represented by the formula:

$$\left[M^{2+}_{(1-X)}M^{3+}_{x}(OH)_2\right]^{x+}[A^{n-}]_{x/n}\cdot yH_2O,$$

where $M^{2+}$ and $M^{3+}$ are di- and tri-valent cations respectively, x is their molar ratio, $$\frac{M^{2+}}{(M^{2+}+M^{3+})},$$

which is generally in the range 0.2-0.33 and $A^{n-}$ is the interlayer anions. The two-dimensional configuration of clay and clay-like nanoparticles renders the prediction of their coagulation rate and aggregate geometry challenging. This is in contrast to isotropic particles, for which the rate of particle coagulation and mechanism are well established due to DLVO (Derjaguin-Landau-Verwey-Overbeek) forces.

The term "colloidal particles", as used herein, refers to insoluble or semi-insoluble particles which are suspended in liquid, where the surface forces acting on the particles are at least comparable and usually larger in magnitude than bulk forces which act on the particles. Surface forces are forces on the particles that originate from interactions between physical mechanisms near the surfaces of the particles, e.g., van der Waals, electrical double layer, hydrophobic, and hydrophilic forces. Bulk forces are forces on the particles which are proportional to the mass and volume of the particles, e.g., the gravitational force. Particles satisfy the requirement that surface forces are comparable or greater than bulk forces on the particles and may be defined as colloidal particles when their lateral length, in at least one direction, is smaller than 100 micro-meter and larger than 1 nano-meter. Under this definition, nanoparticles, submicron-particles, and micro-particles are all colloidal particles.

The phrase "chemo-responsive colloidal particles" refers to a group or family of colloidal particles that exhibit a chemo-responsive property, which can be defined by their capacity to undergo reversible response to changes in the chemistry of the liquid around them. For example, the particles will coagulate to form fluid-impermeable aggregates at certain pH levels and will de-coagulate (aggregate disassembly) when reversing the pH levels. Namely, the particles will go back to a state of a dispersion where the particles are detached from each other in the liquid, thereby allowing fluids to flow therethrough. The specific levels of pH that result in coagulation ("closed" state) or de-coagulation ("open" state) may be altered by changing the surface chemistry of the same particles or by choosing different particles of existing different surface chemistry for preparing the particles for use in a flow-gate.

According to an aspect of some embodiments of the present invention, the flow-gate provided herein includes at least one flow-chamber having at least one inlet and at least one outlet. The flow-chamber is filled with a colloid of chemo-responsive colloidal particles, such as clay and clay-like particles having a Brucite-like structure, as defined below. These colloidal particles are characterized by their ability to form fluid-impermeable aggregates in response to changes in the concentration of at least one solute in the colloid. In operation, the flow-gate allows fluid to flow through the inlet and into the flow-chamber. The colloid of chemo-responsive colloidal particles in the flow-chamber will respond to changes in the concentration of at least one solute in the fluid by forming fluid-impermeable aggregates. This will impede the flow of fluid through the flow-chamber and effectively control the flow of fluid through a system that includes the flow-gate.

According to some embodiments of the present invention, the chemo-responsive colloidal particles have a Brucite-like structure. Brucite-like structures are a type of mineral structure that is similar to the crystal structure of brucite, which is a mineral composed of magnesium hydroxide ($Mg(OH)_2$). Brucite-like structures are defined by exhibiting layers of positively charged metal cations, such as magnesium, aluminum, or zinc, and other metal ions of 2-3 valency, sandwiched between layers of hydroxide and other mono- and multiatom anions, and water molecules. The overall structure of brucite-like minerals is described as being layer-sheet-layer, and they often have applications in various fields, including catalysis, environmental remediation, and energy storage.

According to some embodiments of the present invention, the chemo-responsive colloidal particles may be represented by general Formula I:

$$\left[M^{2+}_{(1-x)}M^{3+}_{x}(OH)_2\right]^{x+}[A^{n-}]_{x/n} \qquad \text{Formula I}$$

wherein:
 $M^{2+}$ is a divalent metal ion,
 $M^{3+}$ is a trivalent metal ion,
 x is a molar ratio $$\frac{M^{2+}}{\left(M^{2+} + M^{3+}\right)}$$

raging 0.2-0.33,

A$^{n-}$ is a monoatomic or polyatomic anion, and n is an integer ranging 1-3.

According to some embodiments of the present invention, M$^{2+}$ can be any one of Mg$^{2+}$, Cd$^{2+}$, Co$_{2+}$, Cr$^{2+}$, Cu$^{2+}$, Fe$^{2+}$, Hg$^{2+}$, Mn$^{2+}$, Ni$^{2+}$, Pb$^{2+}$, and Zn$^{2+}$.

According to some embodiments of the present invention, M$^{3+}$ can be any one of Al$_{3+}$, Cr$^{3+}$, Dy$^{3+}$, Er$^{3+}$, Eu$^{3+}$, Fe$^{3+}$, Gd$^{3+}$, Ho$^{3+}$, La$^{3+}$, Lu$^{3+}$, Mn$^{3+}$, Nd$^{3+}$, Pr$^{3+}$, Sc$^{3+}$, Sm$^{3+}$, Tb$^{3+}$, Tm$^{3+}$, Y$^{3+}$, and Yb$^{3+}$.

According to some embodiments of the present invention, A$^{n-}$ is an interlayer, such as, without limitation, a halide ion, OH$^-$, NO$_3^-$, NO$_2^-$, CO$_3^{2-}$, SO$_4^{2-}$, SO$_3^{2-}$ and PO$_4^{3-}$, In some embodiments, the metal of M$^{2+}$ is a different metal than the metal of M$^{3+}$.

According to some embodiments, the metal ions are ions of magnesium and aluminum.

The clays and clay-like substances, referred to herein as chemo-responsive colloidal particles, which are represented by Formula I, are typically found in a hydrated form, namely several water molecules interact with the structure, corresponds to the number of water molecules, which may change according to solution condition, i.e., pH level. Hence, Formula I can be supplemented with yH$_2$O, wherein y corresponds to the number of water molecules in the lattice of the substance.

Non-limiting examples of chemo-responsive colloidal particles suitable for use in a flow-gate, according to some embodiments of the present invention, include chemo-responsive LDH particles such as, without limitation, nickel-iron containing (Ni—Fe) LDH and magnesium-aluminum containing (Mg—Al) LDH. Additional LDH chemical compositions which are useful in the context of chemo-responsive colloidal particles, according to some embodiments of the present invention, include, without limitation, LDHs according to Formula I, comprising Fe—Al—Cl, Fe—Al—NO$_3$, Fe—Al—OH, Mg—Al—Cl, Mg—Al—NO$_3$, Mg—Al—OH, Ni—Al—Cl, Ni—Al—NO$_3$, Ni—Al—OH, Zn—Al—Cl, Zn—Al—NO$_3$, and Zn—Al—OH.

Additional colloidal particles which are useful in the context of chemo-responsive colloidal particles which may be present in the flow-gate include, without limitation, particles of natural and artificial chemo-responsive clays, substances with Brucite-like structure, metal and semi-metal oxides (e.g., SiO$_2$, glass and bromo-glass, and AlO$_2$), and natural and artificial polymer-based chemo-responsive colloidal particles (e.g., polystyrene, polymethylmethacrylate, and polyamides).

Clay is a particle that in its natural form exist in soil and contains hydrous aluminum phyllosilicates minerals (e.g., kaolin, Al$_2$Si$_2$O$_5$(OH)$_4$). The clay molecule may further contain variable amounts of iron, magnesium, and alkali metals.

One example of chemo-responsiveness, which is harnessed in some embodiments of the present invention, is pH-responsive particles. Embodiments of the present invention provide stimuli-induced colloidal flow-gates for reversible and non-reversible flow regulation by imitating the natural tendency of clay particles to block aqueous fluid permeation through soil at specific pH values. pH-Responsive colloidal particles change their aggregation state as a response to the pH level in the aqueous medium in contact therewith. The particles are rendered pH-responsive by choice of their surface properties, e.g., electrostatic surface properties (zeta potential), chemical grafting or physical adsorption of pH responsive molecules or polymer on the particle surfaces. To realize this, the present inventors measured the effect of pH on the zeta potential and rate of coagulation in clay-like LDH aqueous suspensions. Employing DLS and zeta potential analyses indicated that at pH values of approximately 10.8 and below, the pH-responsive colloidal particles in the suspension possess large zeta potential values and are stable with no apparent sedimentation for at least 12 hours. At pH levels greater than 10.8 (more alkaline), the present inventors observed that the zeta potential in the suspension decreases, reaching the point of zero charge at a pH level of 12.2. The coagulation of particles becomes apparent, and its rate increases with increasing pH levels.

Employing the insights about the connection between the coagulation-sedimentation processes of the LDH particles and the pH value in the suspension, the present inventors fabricated an exemplary reversible and non-reversible LDH-based colloidal gate for fluid mass transport. The present inventors have shown that, subject to the characteristic time for coagulation at each pH value, the gates reduce the flow speed of EtOH or water. The present inventors further showed that the extent of obstruction to the flow (i.e., the "closed" state) may be tuned by altering the equilibration time for pH 12.6. Moreover, the present inventors have demonstrated that this concept may be extended to prevent or allow the passage of larger molecules (compared to H$_2$O and EtOH) and even provides selective transport based on molecular size. The macro-scale control over the nanoscale particle assembly and function is afforded by the non-isotropic 2D plate-like geometry of the LDH.

Another example of chemo-responsiveness, which can be harnessed in some embodiments of the present invention, is responsiveness to ionic strength (e.g., salinity), or ionic-responsiveness. Ionic-responsiveness refers to the ability of a chemical or material to change its through-flow properties or behavior in response to changes in the ionic concentration of the environment of the colloidal particles. Ionic-responsive colloidal particles change their aggregation state as a response to the concentration of some cations and anions (ionic solutes) in the aqueous medium in contact. The colloidal particles are rendered ionic-responsive by choice of their surface properties, e.g., electrostatic surface properties (zeta potential), chemical grafting or physical adsorption of pH responsive molecules or polymer on the particle surfaces. Exemplary ionic-responsive colloidal particles include clay-like LDH particles in aqueous suspensions, which tend to reversibly aggregate and block through-flow upon an increase or a decrease in the concentration of ions in the liquid. Upon reversal of the change in ionic strength in the liquid aggregates of the particles break down in the aqueous suspension. Other salinity-responsive colloidal particles include natural and artificial clays, oxides, such as Al$_2$Si$_2$O$_5$(OH)$_4$·yH$_2$O and (Ca/Na/H)(Al/Mg/Fe/Zn)$_2$(Si/Al)$_4$O$_{10}$(OH)$_2$·yH$_2$O, where y represents the amount of water between the layers.

The effectiveness of the flow-gate provided herein correlates to their size, and size distribution. In some embodiments, the size of the chemo-responsive colloidal particles ranges 0.1-1,500 μm, 0.1-1,000 μm, 0.1-500 μm, 0.1-100 μm. In some embodiments wherein naturally occurring clays are used in the herein-provided flow-gate, the size of the chemo-responsive colloidal particles ranges 0.1-1,000 μm.

As "space-filling" is another way to describe tight agglomeration of colloidal particles that affords the "closed" state in the flow-gate provided herein, an optimal particle size distribution to maximize space-filling is a broad distribution of particle sizes. In general, a broad particle size distribution with particles spanning the entire size range typically leads to better space filling compared to a narrow particle size distribution with particles restricted to a narrow size range. For instance, in a porous material, such as the colloidal particles discussed herein, a broad particle size distribution with particles ranging from sub-micron to millimeter-sized particles can lead to more efficient space-filling, as particles can fill the interstitial spaces between larger particles. This can result in a more uniform packing and a higher overall porosity.

When particles exhibit a broad size distribution profile, it means that the particles have a wide range of sizes and that there is no dominant size in the population. This can be observed when the particles are analyzed using a particle size analysis technique such as dynamic light scattering, laser diffraction or electron microscopy. A broad size distribution can result from several factors such as incomplete mixing during synthesis, aggregation, or fragmentation of particles during storage, handling or processing. A broad size distribution profile can impact the properties and performance of materials, for example, it can affect the mechanical strength, surface area, and reactivity of the particles. In the context of the present invention, a broad size distribution facilitates aggregation and thus the transition from a colloid of suspended particles ("open" state) to a flow-impervious plug ("close" state).

In the context of the present invention, a broad size distribution profile means that the particles are found in all or some sizes in the range, or at least in some large, at least some medium and at least some small size within the range. Unlike in many applications that utilizes colloidal particles in flow systems, which require uniform size (narrow size distribution profile) to allow smooth flow, the invention provided herein actually requires that the flow will be stopped controllably, and this feat is better served with a plurality of particles in a plurality of sizes.

A broad particle size distribution can be defined as a distribution of particles with a size range spanning at least two orders of magnitude, and where the particle size is spread out over the entire size range, such that no single size bin represents a significant proportion of the total particle population. For example, a broad particle size distribution for particles ranging in size from the low range value (e.g., 0.1 microns) to the high range value (e.g., 1000 microns) could be defined as a distribution where no single size bin represents more than 30% of the total particle population, and where the size range spans at least two orders of magnitude (e.g., from 0.1 microns to 1000 microns). Hence, the chemo-responsive colloidal particles are further characterized by a broad particle size distribution, such that no single size bin represents more than 30% of the total particle population, and the size range spans at least two orders of magnitude. In one exemplary embodiment, the particle size ranges from 0.1 microns to 1000 microns, and split arbitrarily into 5 size bins, which can lead to effective space filling:

0.1 micron to 200 microns: 10% of the plurality of particles;
200 microns to 400 microns: 15%;
400 microns to 600 microns: 20%;
600 microns to 800 microns: 25%; and
800 microns to 1000 microns: 30%.

This distribution also represents a broad range of particle sizes, from small sub-micron particles to much larger particles, which can fill spaces and lead to a more uniform packing. The distribution also has a relatively high proportion of larger particles, which can help fill the interstitial spaces between smaller particles and further improve space filling.

The following is an example of an effective space-filling particle size distribution for particles ranging in size from 0.1 microns to 1000 microns with 5 size bins, where the smaller size particles are more abundant:

0.1 micron to 200 microns: 25% of the plurality of particles;
200 microns to 400 microns: 20%;
400 microns to 600 microns: 15%;
600 microns to 800 microns: 10%; and
800 microns to 1000 microns: 5%.

This distribution represents a broad range of particle sizes, from small sub-micron particles to larger particles that has a higher proportion of smaller particles, which can fill the interstitial spaces between larger particles and lead to a more uniform packing.

Another exemplary broad particle size distribution for particles with a size range from 0.1 micron to 1000 microns can be represented as follows:

0.1 micron to 1 micron: 20% of the plurality of particles;
1 micron to 10 microns: 20%;
10 microns to 100 microns: 30%; and
100 microns to 1000 microns: 30%.

This example distribution indicates that 20% of the particles are between 0.1 and 1 micron in size, 20% are between 1 and 10 microns, 30% are between 10 and 100 microns, and 30% are between 100 and 1000 microns. The distribution is hypothetical and the actual particle size distribution may differ, depending on the sample and measurement method.

Another exemplary broad particle size distribution for particles with a size range from 0.1 micron to 1000 microns can be represented as follows:

0.1 micron to 1 micron: 15% of the plurality of particles;
1 micron to 10 microns: 25%;
10 microns to 100 microns: 30%; and
100 microns to 1000 microns: 30%.

This distribution indicates that 15% of the particles are between 0.1 and 1 micron in size, 25% are between 1 and 10 microns, 30% are between 10 and 100 microns, and 30% are between 100 and 1000 microns.

Yet another example of a broad particle size distribution for particles with a size range from 0.1 micron to 1000 microns, where the middle-sized particles are more abundant:

0.1 micron to 1 micron: 12% of the plurality of particles;
1 micron to 10 microns: 30%;
10 microns to 100 microns: 30%; and
100 microns to 1000 microns: 28%.

This distribution indicates that 12% of the particles are between 0.1 and 1 micron in size, 30% are between 1 and 10 microns, 30% are between 10 and 100 microns, and 28% are between 100 and 1000 microns.

The following is an example of a broad particle size distribution for particles with a size range from 0.1 micron to 1000 microns, where there is equal representation of particle size in 5 size bins:

0.1 micron to 200 microns: 20% of the plurality of particles;
200 microns to 400 microns: 20%;
400 microns to 600 microns: 20%;
600 microns to 800 microns: 20%; and 800 microns to 1000 microns: 20%.

This distribution indicates that a fifth of the particles are in each of the five size bins.

The effectiveness of the flow-gate provided herein also correlates to the amount of the chemo-responsive colloidal particles, and the cross-sectional area of the flow-chamber. In general, the capacity of the flow-gate to shift from the "open" state to the "closed" state effectively relates to the amount of the chemo-responsive colloidal particles enclosed in the flow-chamber and the cross-sectional area of the flow-chamber. The amount of the chemo-responsive colloidal particles enclosed in the flow-chamber is determined based on the given hydraulic pressure in the flow system what the flow-gate forms a part of, the internal volume and the cross-sectional area of the flow-chamber, and the desired flow-rate.

The cross-sectional area of a flow-chamber refers to the area of the cross-section of the chamber through which fluid flows. It is the area of the opening or the space that the fluid flows through. This area can be measured in various units such as square millimeters, square centimeters, or square meters. The cross-sectional area of a flow-chamber determines the amount of fluid that can flow through the chamber at a given time. A larger cross-sectional area allows for a greater flow rate, while a smaller cross-sectional area limits the flow rate. The cross-sectional area can be adjusted by changing the shape or size of the flow-chamber, for example, by making the opening wider or by using a larger diameter conduit.

The cross-sectional area may not be constant along the entire length of the flow-chamber. For example, in some designs the cross-sectional area may change along the flow direction, such as in a converging-diverging nozzle, this change in cross-sectional area can affect the flow rate and other properties of the fluid. In the context of some embodiments of the present invention, one can use the average cross-sectional area to determine the amount of the chemo-responsive colloidal particles enclosed in the flow-chamber. In some embodiments, one can use the minimal cross-sectional area to determine the amount of the chemo-responsive colloidal particles enclosed in the flow-chamber. In some embodiments, one can use the maximal cross-sectional area to determine the amount of the chemo-responsive colloidal particles enclosed in the flow-chamber.

When the amount of particles placed inside the flow-chamber is increased, the probability of particles blocking the flow increases, and the effectiveness of flow-gate improves. However, if the amount of particles is too high, the flow-chamber may become clogged, reducing the flow rate and decreasing the effectiveness of the flow-gate. On the other hand, the cross-sectional area of the flow-chamber also plays a role in the effectiveness of the flow-gate. A larger cross-sectional area allows for a greater flow-rate. A balance can be found between the desired flow-rate and the amount of amount of the chemo-responsive colloidal particles enclosed in the flow-chamber, in order to achieve optimal flow-gate operation.

Generally, the amount of dry chemo-responsive colloidal particles per 1 square centimeter ($cm^2$) of cross-sectional area of the flow-gate is at least 1 gram. In some embodiments the amount of chemo-responsive colloidal particles per 1 $cm^2$ of cross-sectional area of the flow-gate ranges at least 0.1-1 gram. For example, in an exemplary embodiment, the cross-sectional area of the flow-chamber is about 1 $cm^2$, and in this exemplary embodiment, the amount of dry chemo-responsive colloidal particles that is put in the flow-chamber is at least 0.5 grams.

Response to Environmental Conditions:

In some embodiments, the flow-chamber which the chemo-responsive colloidal particles are confined to, further has a semi-permeable opening that is not the inlet or the outlet of the flow-chamber, is not configured to let flow-through fluid pass therethrough, and the two sides of opening are each in direct contact with the immediate surrounding (environment) on the outside, and with the colloid or slurry of chemo-responsive colloidal particles on the inside. The semi-permeable opening is permeable at least to hydrated ions in aqueous media in the immediate surrounding of the flow-gate device, such that an intimate contact is present between the semi-permeable opening and the immediate surrounding. This semi-permeable opening allows the presently disclosed flow-gate to respond to (changes in) the chemistry of the immediate environment which the device is in intimate contact with, as well as to (changes in) the chemistry of the through-flow fluid.

In some embodiments, a semi-permeable opening in the flow-gate device includes a semi-permeable barrier made of substances that allow certain molecules or ions to pass through while preventing others from passing through. Non-limiting examples of semi-permeable materials include: cellulose esters and crosslinked cellulose membranes, which is a type of plastic that is used in water filtration systems and dialysis, and is semi-permeable to water molecules; silica gel in the form of a porous solid; polyethylene glycol, which is a synthetic polymer that is used in various applications as a semi-permeable substance to certain ions and small molecules; natural rubber, which is semi-permeable to gases and liquids; calcium alginate gels, which are semi-permeable to water and some small molecules, and zeolites, which are mineral structures with a porous microcrystalline structure that are semi-permeable to small molecules based on their size and shape.

In one exemplary embodiment, the flow-gate allows or blocks flow in response to the pH or salinity of the environment outside of the flow-chamber. The environment may be, without limitation, an aqueous solution, a solid, or humid soil. The chemo-responsive colloidal particles in the flow-chamber undergo coagulation ("closed" state) or de-coagulation ("open" state) in the flow-chamber and thus block the flow or allow for flow through the flow-chamber, respectively, as a result of changes in the pH or salinity levels in the flow-chamber, which are affected by the pH or salinity levels in the environment outside the flow-chamber, and/or by the pH or salinity levels in the liquid when it is flowing through the flow-chamber.

Size-Discrimination Filter

In some embodiments of the present invention, the through-flow state of the presently claimed flow-gate is dose-responsive, and ranges from a closed state to an open state in a continuous range of intermediate flow-rate states, wherein the physical difference between the flow-rate configurations is essentially a representation of the size of flow-paths between the particles in the colloid of particles, whereas dissolved molecules of the fluid can pass through the open flow-paths. The intermediate states can therefore be used to filter solutes (dissolved molecules) in the fluid based on size discrimination; namely, the flow-gate provided herein can be fine-tuned to let solute molecules under a predefined size cut-off to pass, while blocking solute molecules of larger size from passing through. The intermediate state can be controlled by setting or changing the concentration of the effector, which the chemo-responsive colloidal particles are sensitive to.

For example, a flow-gate device, comprising chemo-responsive colloidal particles that are responsive to pH in a dose-response manner, namely the flow-gate is open (maximal flow rate) at a pH 5 and closed at pH 10, and will filter-out objects of an average diameter of more than 2 μm when the flowing medium is at pH 7.5, which means that most bacterial cells will be filtered out from the flowing medium if it is set to pH between 7.5 and 10.

In some embodiments of the flow-gate presented herein, the passage of particulate matter suspended in a flow fluid, is restricted or semi restricted when the particulate matter has an average particle size range equal or greater than the average spacing between the chemo-responsive colloidal particles in their "closed" state; consequently, the through-flow of the dispersing fluid is perturbed only marginally. In some embodiments, the size of the particulates which are blocked, namely the effective cut-off, will decrease with the increase in pH from 5 to 10.

Applications:

The present invention provides a flow-gate that contains a flow-chamber and a colloid of chemo-responsive colloidal particles. These particles have a Brucite-like structure and form fluid-impermeable aggregates in response to changes in solute concentration in the colloid. The size of the colloidal particles can range from 0.1-1000 μm with a broad size distribution profile. The flow-gate may also include a flow-permeable barrier and a semi-permeable opening in communication (in intimate contact) with an external aqueous medium. The chemo-responsive colloidal particles can be pH-responsive or ionic-responsive. The flow-gate can be part of a larger flow system that is configured to respond to changes in pH or ionic strength levels in an external aqueous medium.

The flow-gate provided herein, and a flow system comprising the same, offer several advantages over traditional flow-gates and flow systems. Firstly, they allow for precise and reliable flow control with minimal need for mechanical means, which can reduce the risk of failure and improve the overall performance of the system. Additionally, the chemo-responsive colloidal particles used in the flow-gate can be easily obtained and/or cheaply synthesized, making the flow-gate and flow system cost-effective to produce. The flow-gate can also comprise at least one flow-permeable barrier positioned between said flow-chamber and said outlet for further flow control. The flow-gate can also comprise a semi-permeable opening in intimate contact with the internal colloid and with an aqueous medium in an environment outside the flow-gate, allowing further flow control by responding to changes in the external conditions, wherein the semi-permeable opening is impervious to the chemo-responsive colloidal particles and permeable to at least one solute in the external aqueous medium.

Hence, the invention is also drawn to a flow system comprising at least one flow-gate of the invention. The chemo-responsive colloidal particles can be pH-responsive colloidal particles or ionic-responsive colloidal particles and the system can be configured to allow a flow of a fluid exhibiting at least a pH or ionic strength at which aggregates of the colloidal particles disassemble. This allows for precise and reliable flow control in a larger system, where multiple flow-gates can be used in combination to control the flow of fluid through the system. Furthermore, the flow system can be designed to work with pH-responsive or ionic-responsive colloidal particles, and the pH or ionic strength level of the fluid passing through the system can be set at least a certain level for the aggregates to disassemble and allow flow. This provides an added level of control and flexibility in the flow system. Overall, this invention provides a cost-effective, reliable, and precise flow control method that can be utilized in various agricultural, industrial and laboratory applications.

Applications of the presently provided flow-gate device include, but are not limited to irrigation systems that use greywater. Greywater (or grey water, sullage) refers to wastewater generated in households, offices, streets, small industries and the likes. As greywater contains fewer pathogens than blackwater, it is generally safer to handle and easier to treat and reuse onsite for toilet flushing, landscape or crop irrigation, and other non-potable uses. Greywater may still have some pathogen and contaminated content that may be harmful to the environment of particular crops. In conditions where the quality of greywater is non-stable and/or unpredictable, an irrigation system equipped with the flow-gates provided herein, will be able to respond to an adverse change in the quality of the irrigation greywater, and shut itself off automatically as a response to an increase in, for example, the acidity of the water, thereby preventing crop and soil poisoning.

In another example, and irrigation system that uses semi-saline water, will respond to the salinity of the water and this response will be used to adjust the amount of fresh water that is mixed into the irrigation system when the salinity of the semi-saline water crosses a predefined cut-off concentration.

An exemplary application for a flow-gate having a semi-permeable opening is an irrigation system that uses semi-saline water for irrigation, and adds fresh water to the stream of semi-saline water in order to automatically adjust the salinity of the mixed water. The flow-gate is positioned in the fresh water supply line, and the semi-permeable opening is in intimate contact with the semi-saline water, and the reversible response to an increase in the salinity of the semi-saline water opens the flow-gate to let fresh water flow or increase the flow-rate to a higher rate to lower the salinity in the mixed water.

Another exemplary application for a flow-gate having a semi-permeable opening is an irrigation system in soil. Once the level of salinity or the level of pH in the soil are pass the acceptable/permissible levels due to a change the soil's chemistry, due to depletion of the soil from a nutrient, or due to the application of fertilizer or any other material to the soil, the flow-gate goes to the "open" state or the through-flow increases, thereby adding water or aqueous solution of acceptable levels of salinity and pH levels to the soil to render the salinity or pH levels in the soil within the acceptable levels. Once the level of salinity or the level of pH has reached an acceptable value, the flow-gate goes automatically to the "closed" state, thereby arresting or partially reducing the flow of water or aqueous solution into the soil in a reversible responsive manner.

Another embodiment of the present invention relates to an exemplary application of a flow-gate comprising a semi-permeable opening, which may be utilized in an irrigation system for soilless or hydroponic farming systems. These agricultural methodologies involve the growth of plants in an aqueous solution of nutrients, as opposed to growth in soil. Briefly, soilless and hydroponic farming are agricultural methodologies in which the growth of plants occurs substantially away from the ground, using aqueous solutions of nutrients as a replacement to soil. In this embodiment, the flow-gate allows for the regulation of the flow of the aqueous solution through the flow-chamber, in order to adjust the level of salinity or pH in the solution to an acceptable level. Once the level of salinity or the level of pH in the aqueous solution is not acceptable the flow-gate allows for flow or increase the rate of low through the flow-chamber, adding an aqueous solution to correct the level of salinity or pH of the aqueous solution given to the growth. Once the level of salinity or the level of pH has reached an acceptable value, the flow gate completely arrests or partially reduce the flow of aqueous solution through its chamber in a reversible manner.

It is expected that during the life of a patent maturing from this application many relevant colloidal flow-gates will be developed and the scope of the phrase "colloidal flow-gate" is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions, illustrate some embodiments of the invention in a non-limiting fashion.

Example 1

Mg—Al LDH Nanoparticles Synthesis

The Mg—Al LDH nanoparticles (NPs) were synthesized according to the method described elsewhere [Tathod, A. P. and Gazit, O. M., "*Fundamental Insights into the Nucleation and Growth of Mg—Al Layered Double Hydroxides Nanoparticles at Low Temperature*", *Crystal Growth and Design*, 2016, 16(12), 6709-6713].

Briefly, a 10 ml aqueous solution containing $Al(NO_3)_3H_2O$ (Fisher Scientific) and $Mg(NO_3)_2 \cdot 6H_2O$ (Sigma Aldrich) with a molar ratio of 1:4 was injected (about 3 seconds) using a syringe into a 90 ml of 0.22 M Sodium hydroxide (Bio-Lab) solution under vigorous stirring (1400 rpm). The obtained white slurry was centrifuged at 3880 RCF for 2 minutes (Hermle Z 326 K) and the precipitate was washed three times with milliQ water and redispersed in milliQ water for further use.

Example 2

Characterization Methods

The LDH particles prepared according to Example 1 were characterized by powder X-ray diffraction (PXRD). Patterns were recorded at ambient conditions on a Rigaku SmartLab diffractometer using Cu Kα radiation (λ=1.54 Å) with 3° $min^{-1}$ scan speed and 0.01° angle step at room temperature. Particle size and zeta-potential were measured at 25° C. using dynamic light scattering (DLS) on a ZetaSizer Ultra, Malvern Instruments. Cryogenic transmission electron microscopy (cryo-TEM) imaging was performed on a Thermo-Fisher Talos F200C, FEG-equipped high resolution-TEM, operated at 200 kV. Specimens were transferred into a Gatan 626.6 cryo-holder and equilibrated below −170° C. Micrographs were recorded by a Thermo-Fisher Falcon III direct detector camera, at a 4 k×4 k resolution. Specimens were examined in TEM microprobe mode (TEM bright field) at slight defocus with an inserted objective aperture. Imaging was performed at a low dose mode of work to minimize the exposure of the imaged area to electrons. Images were acquired using the TEM Imaging and Acquisition (TIA) software.

Example 3

Effect of pH—Sample Preparation

A fresh batch of an LDH suspension was prepared for each measurement as described hereinabove. The particle concentration for all samples was fixed at 1 g/l and the pH level was adjusted by the addition of an appropriate amount of aqueous solution of either HCl (Bio-Lab) or NaOH (Bio-Lab). To maintain a constant ionic strength, 10 mM KCl(EMSURE) was added to all samples. The time-dependent settling of the particles in the solutions was monitored by measuring the absorbance at 290 nm using a GENESYS 10S UV-Vis spectrophotometer. The absorbance as a function of time was recorded every 60 seconds for 12 hours for each pH value. The measurements were performed for aqueous suspension with a particle concentration of 1 g/l and electrolyte concentration of 10 mM (KCl).

Example 4

Colloidal Flow-Gate

The experiments were conducted in a 3 ml (internal diameter=1 cm) vertical open-top polyethylene disposable syringe as a column. The particle bed is shown in the insert of FIG. 1 and was composed of 3 layers of dry materials: (1) quartz wool (about 1 mm) at the bottom of the syringe; (2) a 2 mm thick layer of quartz particles (EMSURE); and (3) LDH or quartz (as a control) particles of different heights.

FIG. 1 presents a schematic illustration of a colloidal gate setup scheme, according to some embodiments of the present invention, wherein quartz particles replaced the LDH particles were in the control experiment.

The particle bed was first hydrated by passing milliQ water using hydrostatic pressure. The pH of the LDH bed was controlled by equilibrating the column in either a base solution (pH=12.6) or an acid solution (pH=5.8) using a residence time of 3 minutes. Following each wash, the average flow rate through the column was measured for either ethanol (Bio-Lab) or milliQ water. The flow speed was calculated by averaging the flow rate of 3 repeats 2 ml portions of EtOH\water. The measurements commenced under a hydraulic head of 1 cm of excess liquid above the LDH particle bed and ended once no flow was recorded at the bottom.

Example 5

Particle Properties and Coagulation

Mg—Al—OH LDH particles were synthesized using a standard co-precipitation method, as described hereinabove. The powder X-ray diffraction of the particles provided in FIG. 2 shows a typical diffraction pattern of layered 2D for Mg—Al—OH LDH particles.

Figure 2:
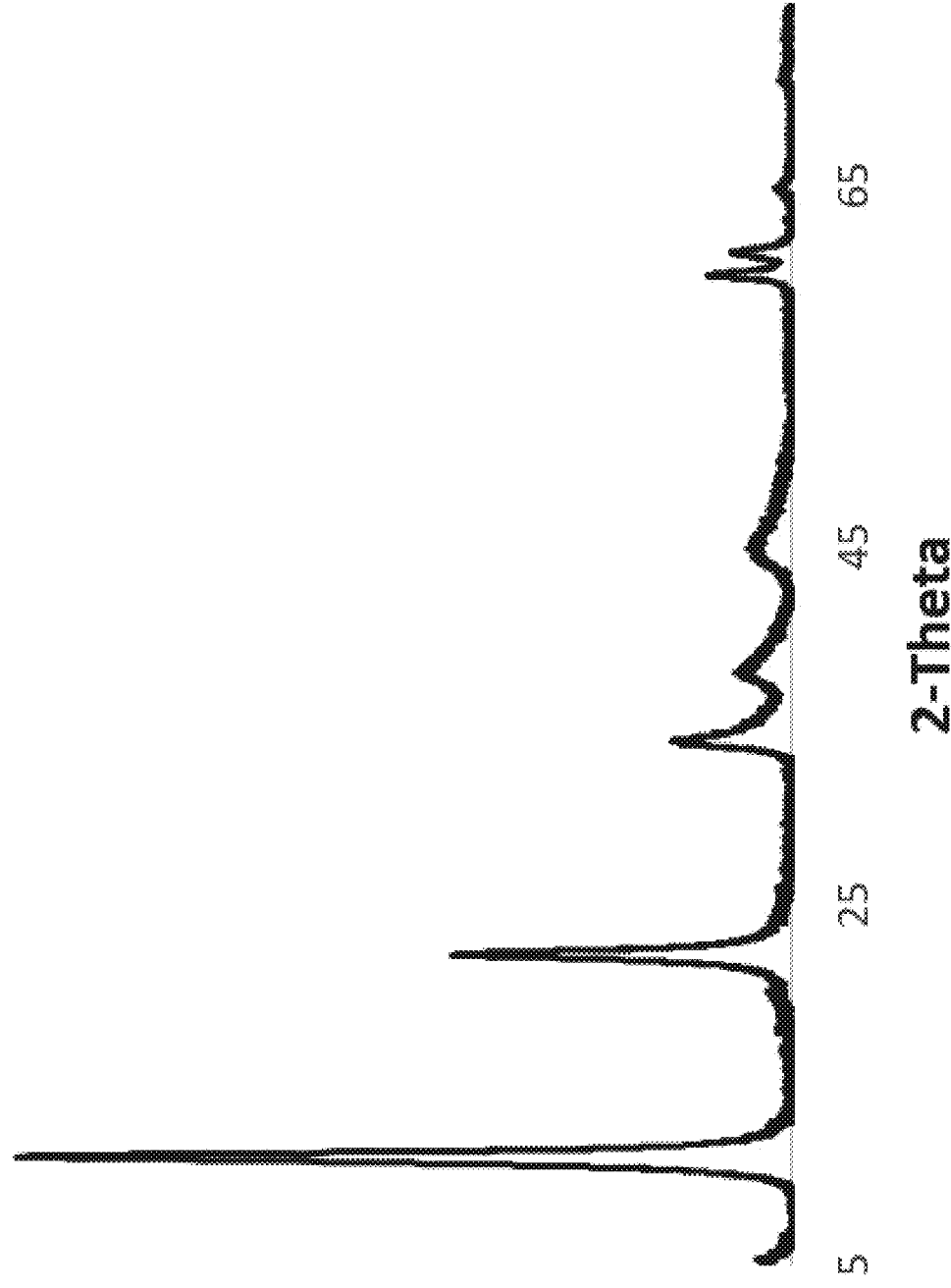
FIG. 2 presents the X-ray diffraction pattern obtained for Mg—Al layered double hydroxides.

FIG. 2 presents the X-ray diffraction pattern obtained for Mg—Al layered double hydroxides.

Boltzmann approximation for zeta potential can be presented as:

$$ZP = A2 + \frac{(A1 - A2)}{\left(1 + e^{(pH - x0)}/dx\right)}; A1 = 40.38,$$

$$A2 = -6.97, x0 = 11.69, dx = 0.30$$

The point of zero charge is calculated by the substitution of the value ZP=0 mV, leading to pHPZC=12.2.

Figure 3:
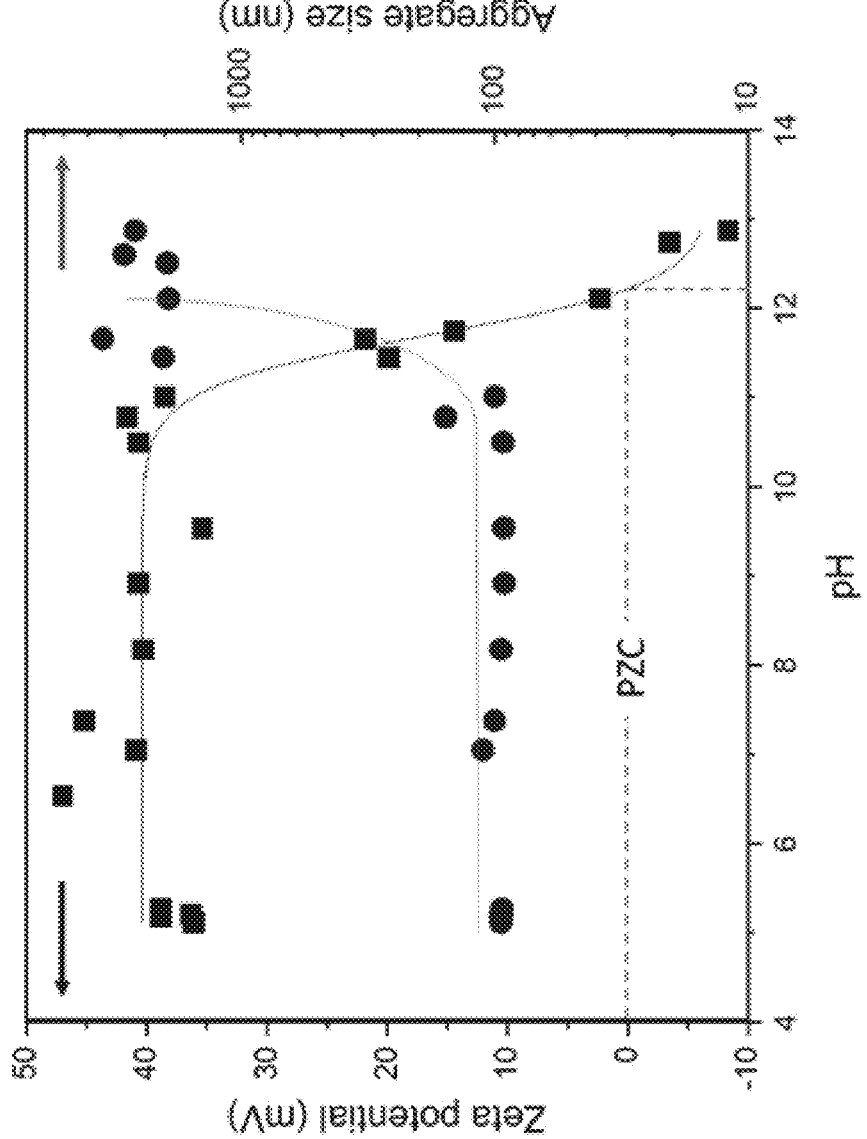
FIG. 3 presents plots of Zeta potential (black squares) and aggregate size (blue circles) of LDH nanoparticles as a function of pH, wherein the solid black line describes the Boltzmann approximation which was used to determine the point of zero charge at PZC, pH=12.2.

In order to understand the effect of pH on the self-assembly process of the particles in solution, the inventors measured the zeta potential and aggregate size of LDH nanoparticles as a function of pH (see, FIG. 3).

FIG. 3 presents plots of Zeta potential (black squares) and aggregate size (blue circles) of LDH nanoparticles as a function of pH, wherein the solid black line describes the Boltzmann approximation which was used to determine the point of zero charge at PZC, pH=12.2. The blue line was added to guide the eye.

As can be seen in FIG. 3, for pH values of 5 to 11 the zeta potential values measured were approximately 40 mV. The suspensions were stable during the entire measurement. In contrast, for pH values of 12.1 to 12.7 the suspensions were unstable and particle coagulation and sedimentation were observed during the measurement. The point of zero charge (PZC) was observed in this range of pH values at approximately 12.2. Variations in aggregate sizes at long-times are consistent with variations in the zeta potential of primary particles. In particular, at pH levels that are smaller than 11, the measured particle size is approximately 100 nm, which is attributed to the average LDH primary particle size. Above a pH level of 11, the average measured particle size increases beyond that of the primary particles, which indicates the presence of agglomerates. Moreover, the connection between the pH and zeta potential was found to be reversible. This was demonstrated by increasing the pH level from 5 to 12.5 causing a reduction in the magnitude of the zeta potential followed by reduction of the pH to observe the corresponding reversible increase in zeta potential (see, FIG. 4).

Figure 4:
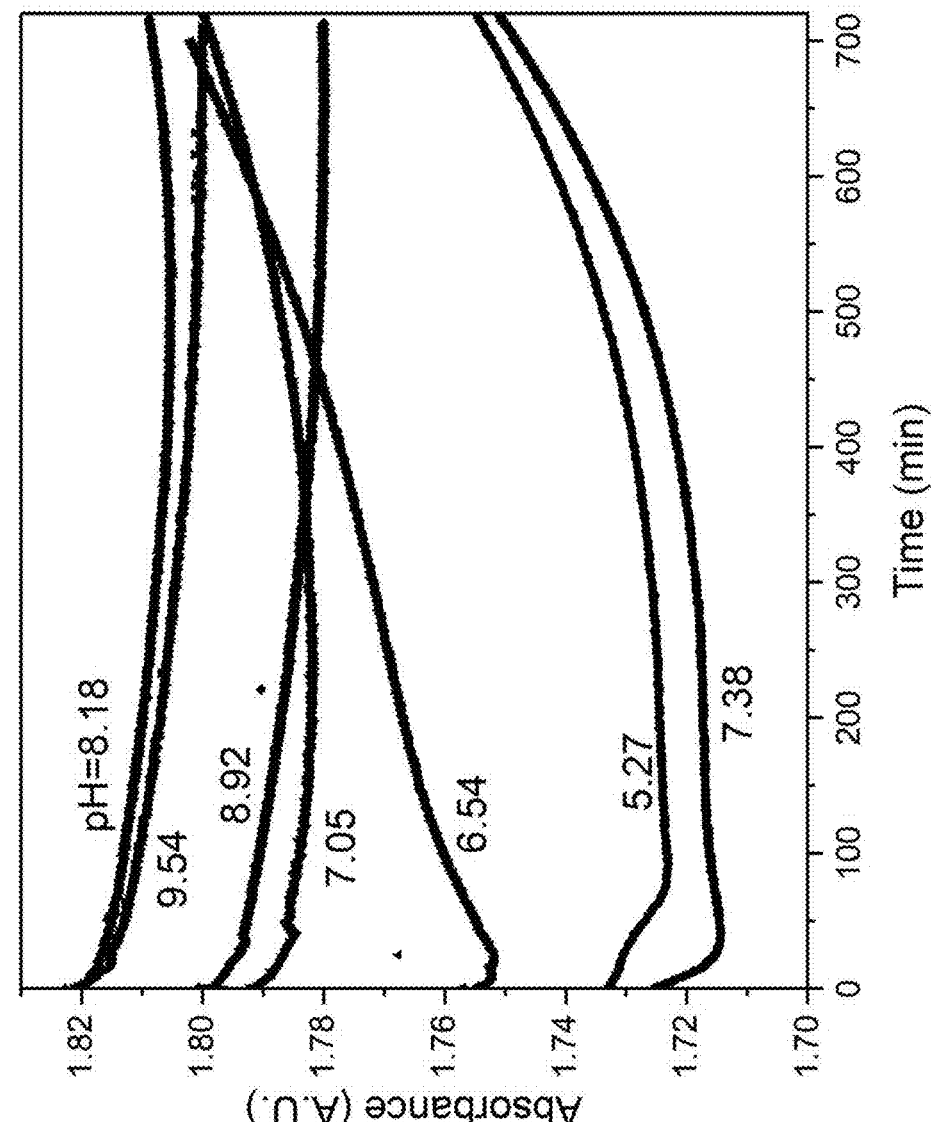
FIG. 4 presents comparative plots of in-situ absorbance at a wavelength of 290 nm vs time for different pH levels below pH=10.8, wherein the measurements were taken every 60 seconds.

FIG. 4 presents comparative plots of in-situ absorbance at a wavelength of 290 nm vs time for different pH levels below pH=10.8, wherein the measurements were taken every 60 seconds.

As can be seen in FIG. 4, the coagulation of the LDH particles is reversible. Notably, the reversibility test shows a slight shift in PZC to about 10 as compared to the 12.2. This discrepancy associated with the difference in ionic strength and particle concentration, which occurs during the experiment. However, from a qualitative perspective it is clear that the particles behave in a reversible coagulation sequence.

Cryo-TEM images of vitrified samples, which were prepared immediately following the making of the suspension sample, give insights into the self-assembly of the LDH suspensions following coagulation. Images were taken of samples at pH levels below the PZC (pH=10.8), at the PZC (pH=12.2), and above the PZC (pH=12.8).

Figure 5:
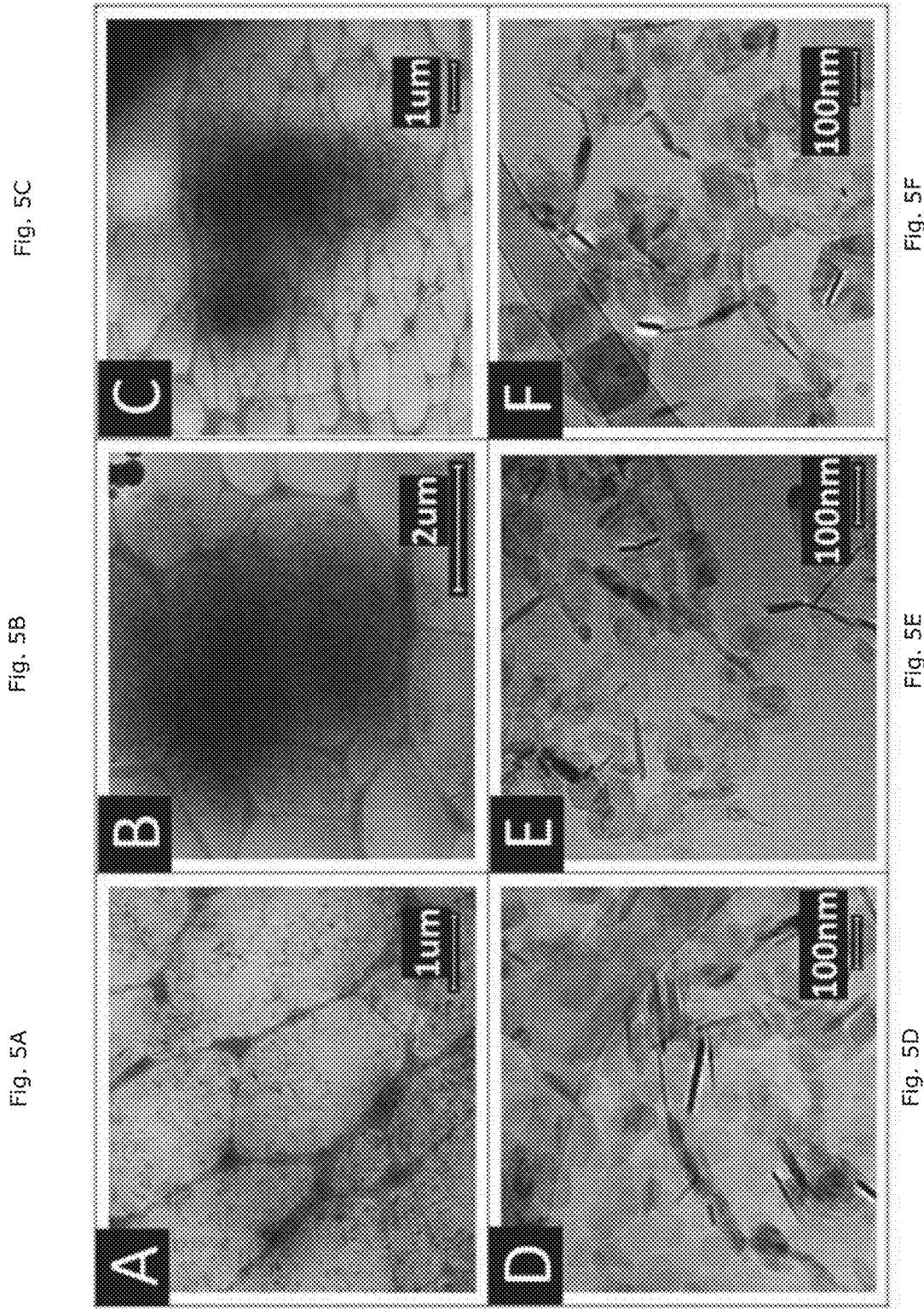
FIGS. 5A-F present cryo-TEM images for colloidal LDH nanoparticles in aqueous suspensions of pH=10.8 (FIGS. 5A and 5D), pH=12.1 (FIGS. 5B and 5E) and pH=12.6 (FIGS. 5C and 5F)

FIGS. 5A-F present cryo-TEM images for colloidal LDH nanoparticles in aqueous suspensions of pH=10.8 (FIGS. 5A and 5D), pH=12.1 (FIGS. 5B and 5E) and pH=12.6 (FIGS. 5C and 5F).

As can be seen in FIGS. 5A-F, below the PZC (FIG. 5A and FIG. 5D) the particles were highly dispersed, as can be expected from a stable suspension. The average size of the primary particles, as measured from the Cryo-TEM images, is approximately 100 nm, which is consistent with the results obtained from the macroscopic DLS measurements of the suspension at the lower pH level in FIG. 3. At the PZC and at pH levels above the PZC, the images show the existence of large aggregates, which indicate coagulation; see for example FIG. 5B and FIG. 5E, FIG. 5C and FIG. 5F. Moreover, the images in FIGS. 5D, 5E and 5F show that the 2D LDH particles have a clear preference to attach to each other through their narrow sides, regardless of pH level. This observation correlates well with a higher surface energy at the narrow edges of the particles as compared to that of their Basal plane.

To better understand the coagulation-sedimentation dynamics of the LDH particle, the inventors monitored the kinetics of the particulate systems by employing in-situ light transmission measurements at a wavelength of 290 nm. This wavelength was selected because it gave the largest change in absorption intensity in the range of 200-800 nm. The intensity of the signal measured by the detector is affected by electronic excitations in the sample and by the diffraction of the light by the particles and aggregates. The electronic excitations within the different samples measured should be constant because all the samples contained the same material. Hence, the changes in the absorption of the sample correspond to the diffraction of light caused by the particles and aggregates, which is strongly affected by the size and dispersion of the aggregates in the slurry. The absorbance of the suspensions at each specific pH level was measured every 60 seconds over 12 hours.

Figure 6:
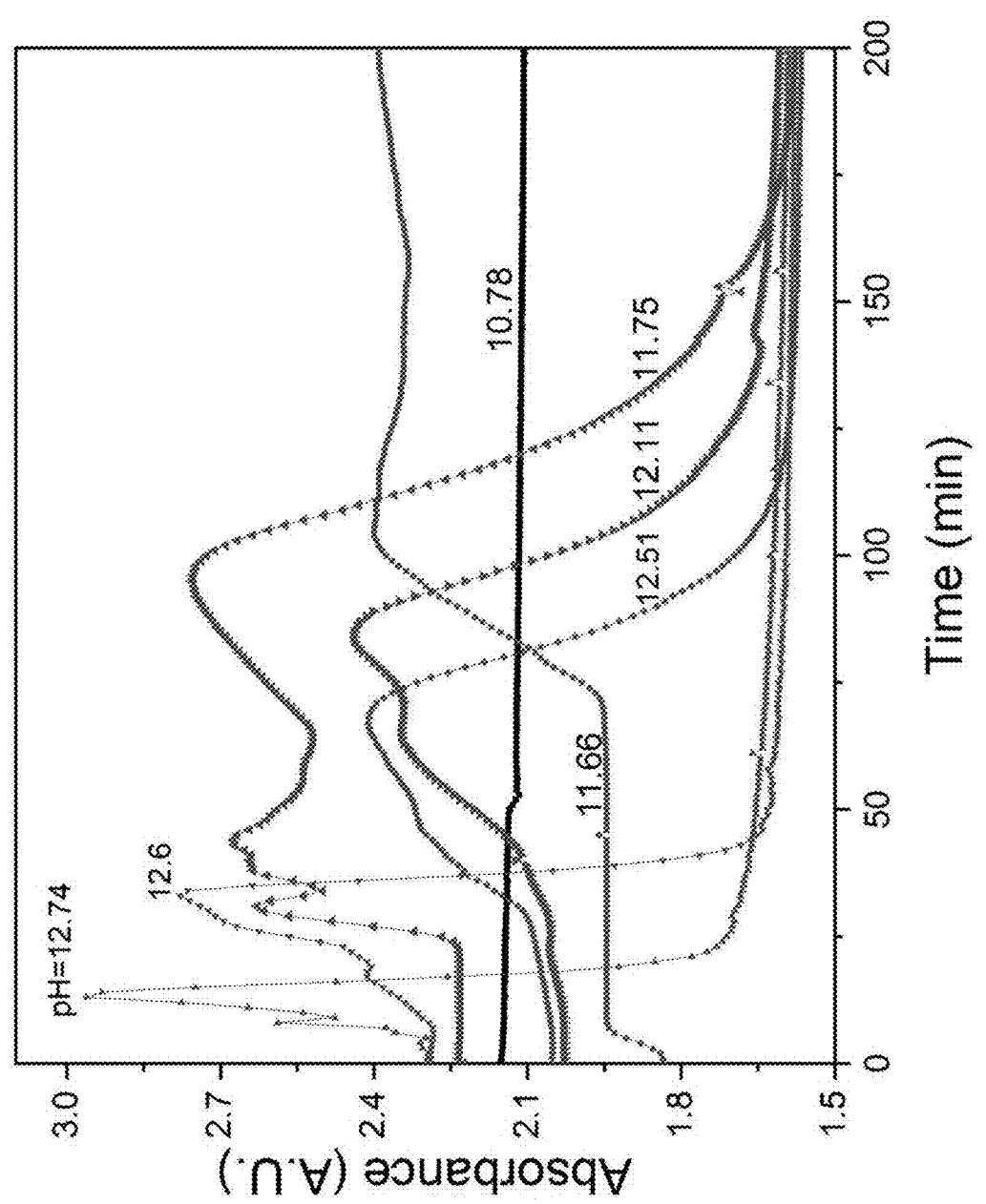
FIG. 6 presents comparative plots of in-situ absorbance at a wavelength of 290 nm representing the level of opaqueness of the LDH suspension vs time for different pH levels above pH=10.8, wherein the measurements were taken every 60 seconds.

FIG. 6 presents comparative plots of in-situ absorbance at a wavelength of 290 nm representing the level of opaqueness of the LDH suspension vs time for different pH levels above pH=10.8, wherein the measurements were taken every 60 seconds.

As can be seen in FIG. 6, the results demonstrate typical coagulation kinetics for pH levels close too or above the PZC (greater than 10.8 in the current system), for which the present inventors observed sedimentation during the experiment time. Each curve in FIG. 6 shows a characteristic absorbance increase in time, which is attributed to the increase in beam scattering due to coagulation of primary particles. This is followed by a decrease in absorbance, which is attributed to agglomerate sedimentation and hence a decrease in sample scattering. The first peak in the absorbance curve in FIG. 6 corresponds to the onset of agglomerate sedimentation. At pH levels of 12.7 and 12.6, the absorbance behavior shows one sharp absorbance peak. Whereas at lower pH levels of 11.7-12.5 the coagulation process was found to be more convoluted, portraying two absorbance peaks before appreciable sedimentation commences.

The first inflection point between the commencement of the experiment and the first absorbance peak vs time is attributed primarily to onset of coagulation. Hence, in these experiments the time of the inflection point at the absorbance data was assigned as a measure for the characteristic time of particle coagulation. The inflection point specific time was calculated by fitting a $3^{rd}$ order polynomial (the lowest order polynomial which supports an inflection point) to the inflection in each curve (see, FIG. 7).

Figure 7:
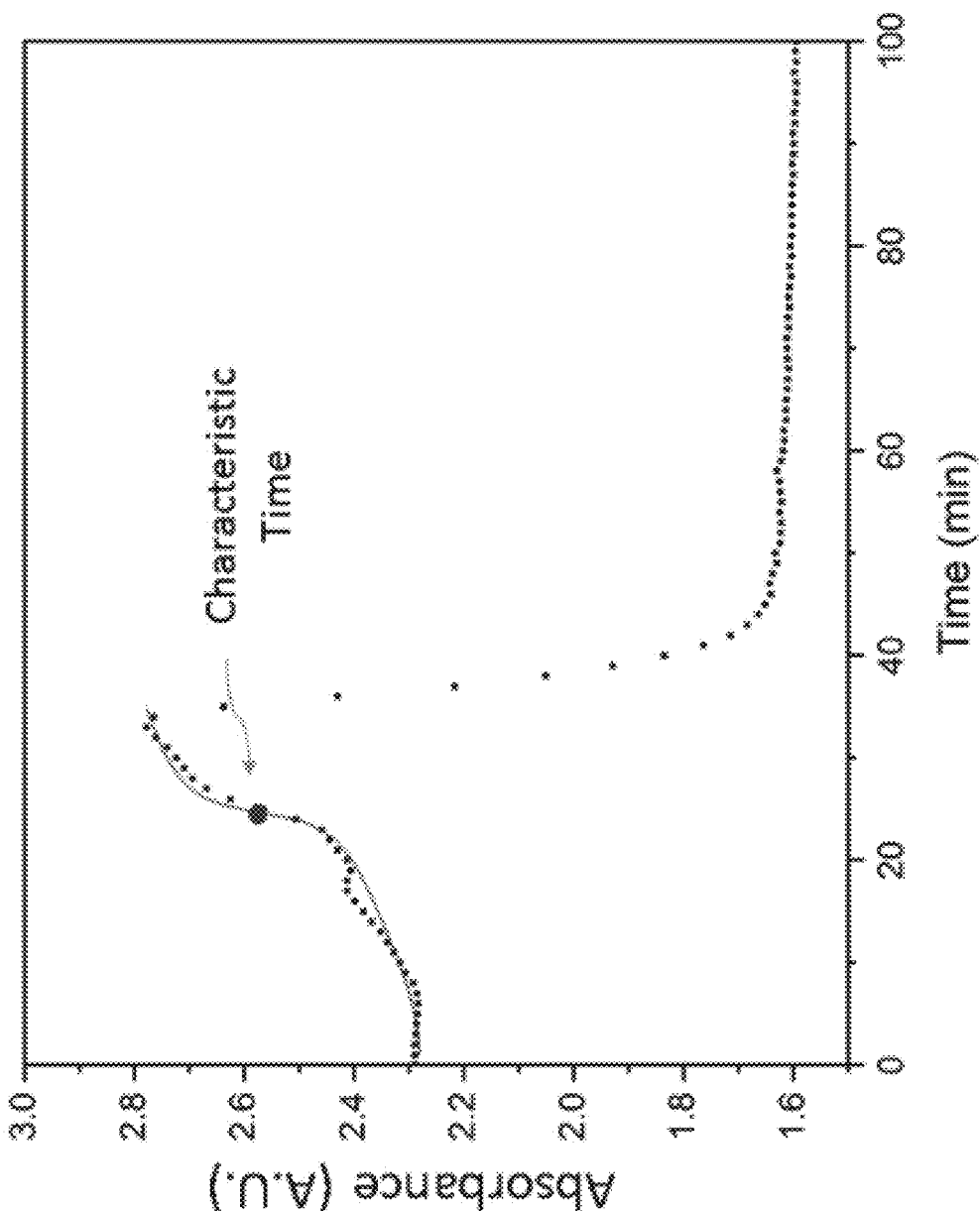
FIG. 7 presents a plot of a $3^{rd}$ order polynomial fit to an absorbance curve for a sample of pH=12.6, wherein the red point is located on the inflection point of the curve which is taken as the characteristic time for coagulation.

FIG. 7 presents a plot of a $3^{rd}$ order polynomial fit to an absorbance curve for a sample of pH=12.6, wherein the red point is located on the inflection point of the curve which is taken as the characteristic time for coagulation.

Figure 8:
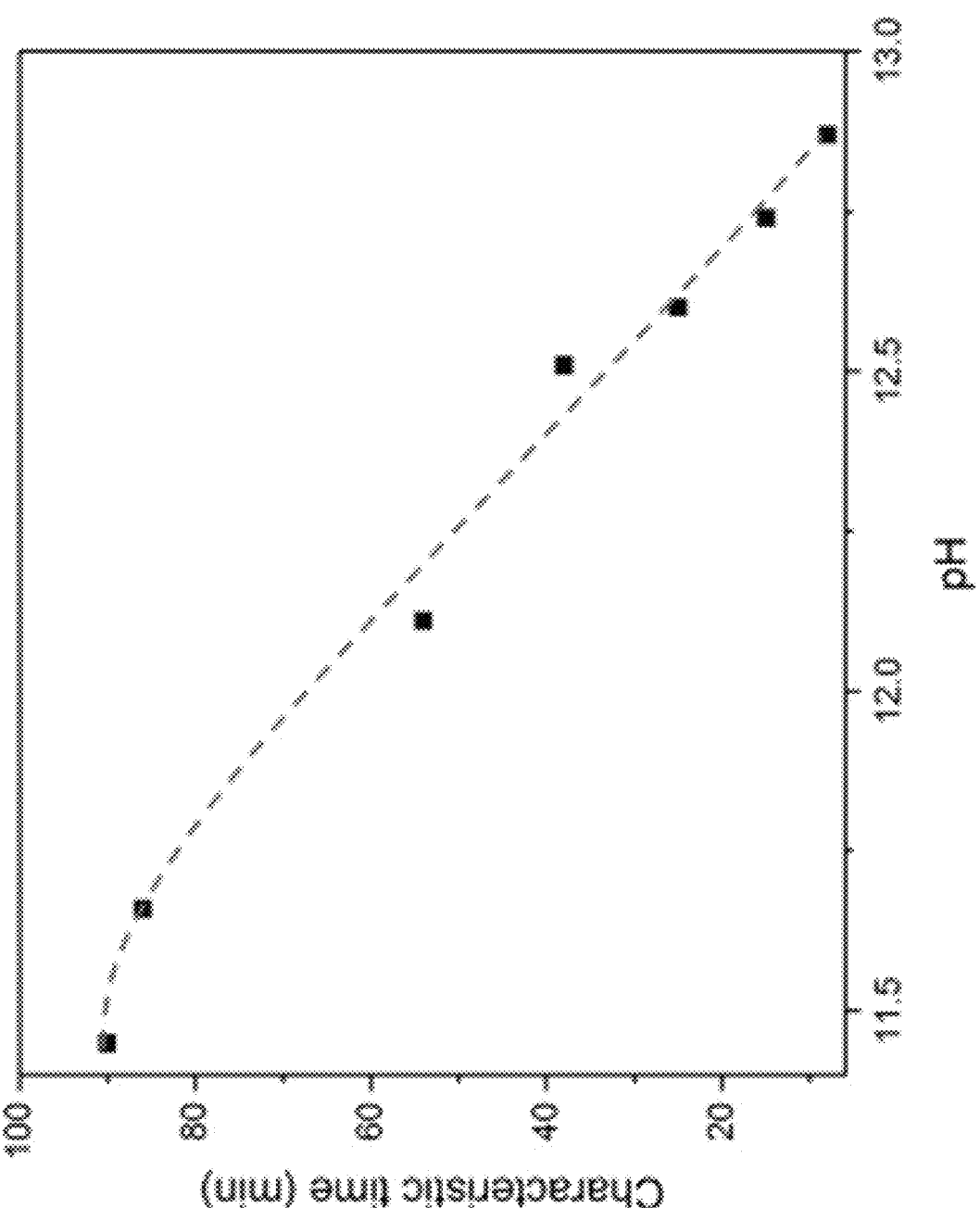
FIG. 8 presents the experimental characteristic time for coagulation of LDH nanoparticles as a function of pH, wherein the dashed line is added for clarity.

The characteristic times of coagulation for the different pH levels are summarized in FIG. 8.

FIG. 8 presents the experimental characteristic time for coagulation of LDH nanoparticles as a function of pH, wherein the dashed line is added for clarity.

In the pH range from 11.5 to 13 the rate of particle coagulation increases (i.e., the characteristic time for coagulation decreases) with the increase in the pH level of the suspension. At pH levels equal to pH of 10.8 (see, FIG. 6) or below (FIG. 4) the absorption curve vs time is flat with no distinct peak in absorbance, which is consistent with a very slow coagulation-sedimentation rate. Hence, the rates of coagulation and characteristic times for pH≤10.8 could not be assigned.

Example 6

Colloidal Gate

The results of the analysis of the effect of pH on the coagulation of clay particles presented hereinabove, the reversibility of the particle's zeta potential due to pH variation, and the sheet like aggregate structures that appear upon coagulation, all suggest that in a thick suspension the non-isotropic, clay-like LDH particles may be exploited as a reversible, pH-activated, colloidal gate for mass transport.

In order to demonstrate this application, according to some embodiments of the present invention, the inventors measured the flow speed of the water at different pH levels through the column, which was comprised of LDH particles (FIG. 1), following three equilibration times. The measured water speed following immersion in a specific pH level for periods of 3, 100 and 1000 minutes is shown in FIG. 9.

Figure 9:
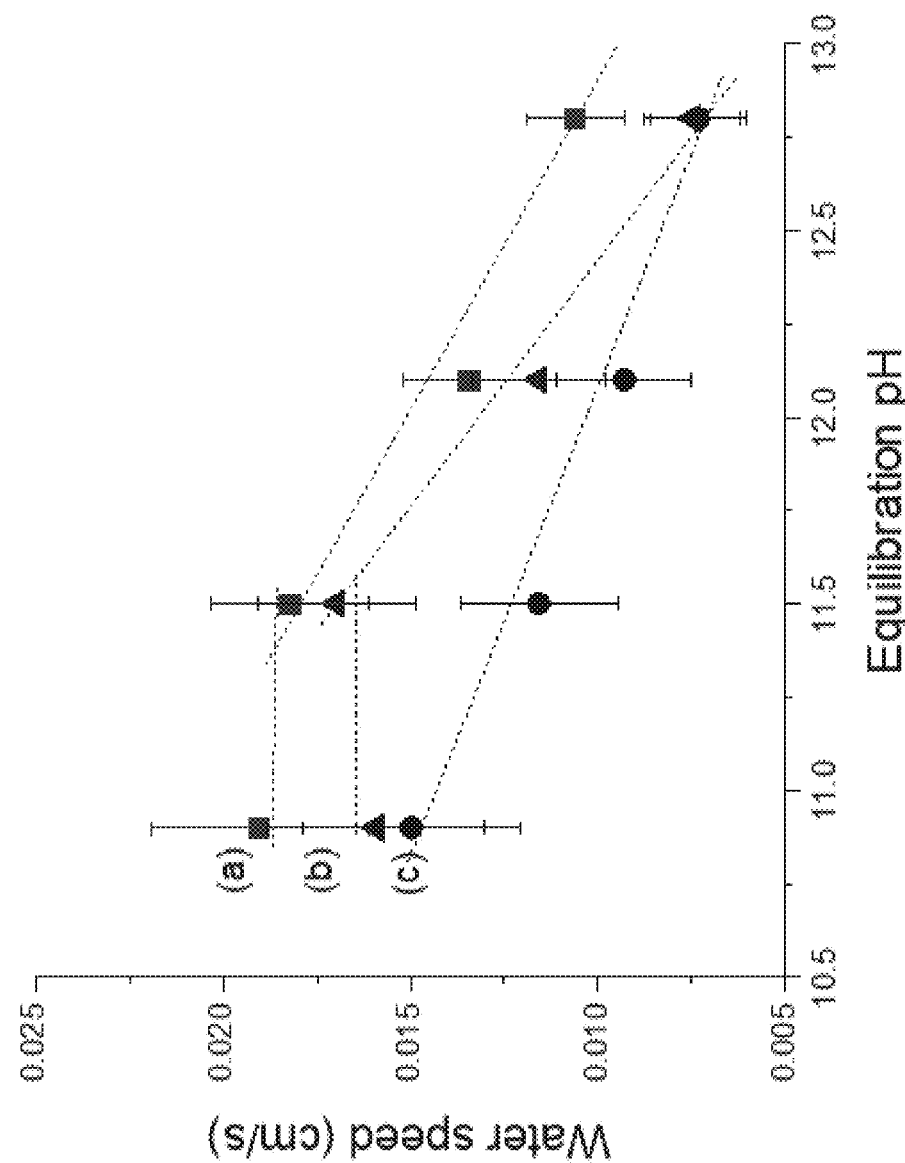
FIG. 9 comparative plots of the water speed through the column that was measured following immersion of the column in a specific pH level for periods of Plot (a) 3, Plot (b) 100, and Plot (c) 1000 minutes, where the symbols are acquired data and the dashed lines are added for clarity.

FIG. 9 comparative plots of the water speed through the column that was measured following immersion of the column in a specific pH level for periods of Plot (a) 3, Plot (b) 100, and Plot (c) 1000 minutes, where the symbols are acquired data and the dashed lines are added for clarity.

The immersion times of 3 and 1000 minutes are shorter and longer by at least one order of magnitude than the characteristic times for coagulation for the different pH values in FIG. 8, respectively. Hence, it may be asserted that following 3 minutes of immersion, the LDH particles are loosely coagulated whereas following 1000 minutes of immersion, the LDH particles are mostly aggregated, as demonstrated in FIG. 5C. Following the intermediate time of 100 minutes of immersion the LDH particles are regarded as partially aggregated.

Noticeably, at pH levels of 10.9 and 11.5 the speed of water through the column was not considerably changed between the immersion time of 3 and 100 minutes. However, for the immersion times at pH levels greater than 11.5 the water speed decreased linearly with the increase in pH levels. This is consistent with the faster coagulation measured at higher pH levels (see FIG. 6). Following an immersion time of 1000 minutes, it was found that the speed of water decreased monotonically with an increase in pH level. This observation suggests that the assembly of the LDH aggregate is dictated by the LDH surface charge associated with the pH of the slurry.

Figure 10:
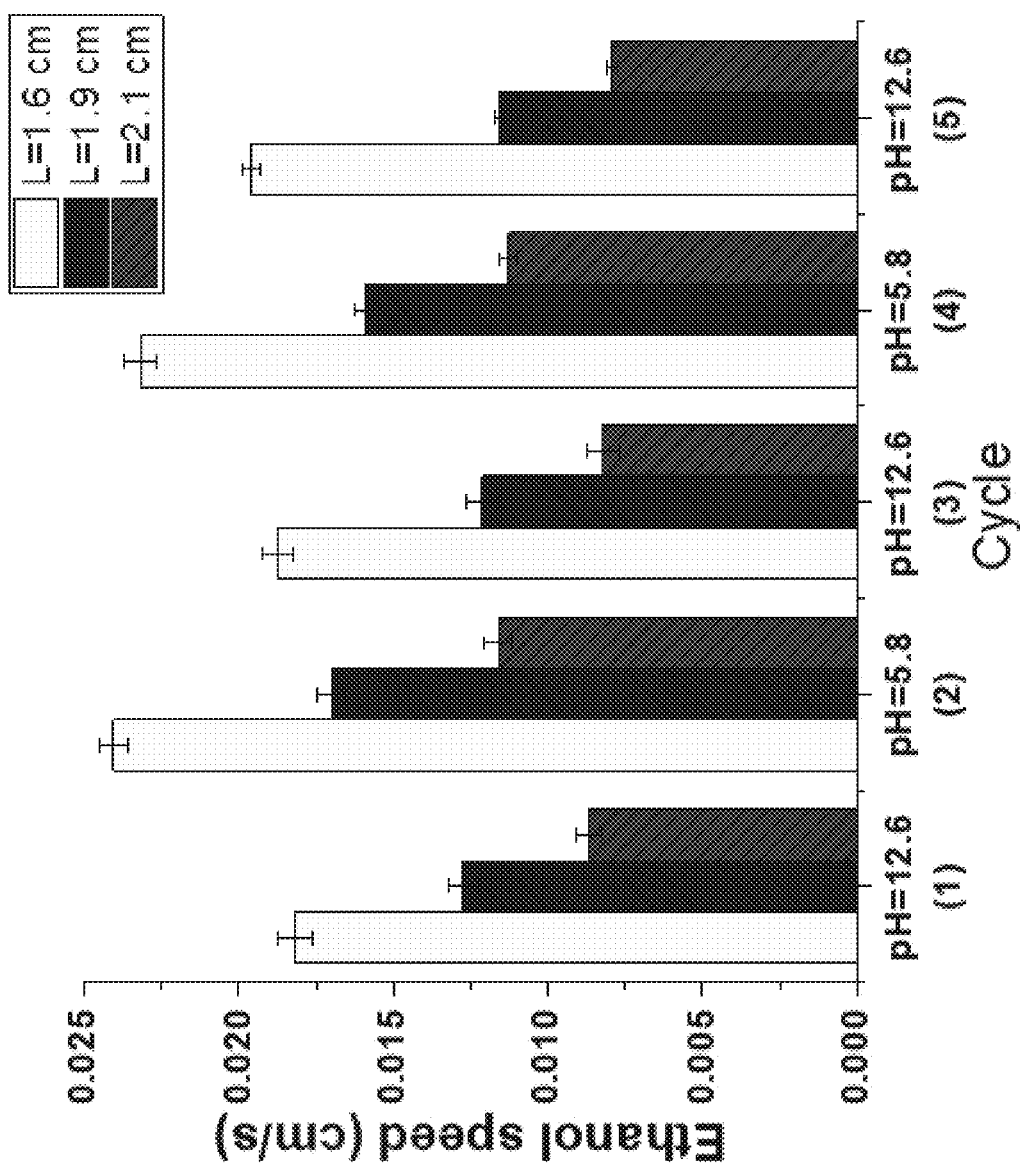
FIG. 10 presents comparative bar plot showing the effect of alternating consecutive pH bed washes (pH=12.6 and pH=5.8) on the ethanol flow speed through an LDH bed at various bed heights 1.6, 1.9, and 2.1 cm (max. SD is 6×10−4 cm/s)

The realization of the colloidal gate was tested at different bed heights as shown in FIG. 10. Measurements of the average flow speed were obtained by gravitationally passing either 2 ml ethanol (EtOH) (FIG. 10) or 2 ml milliQ water (FIG. 11) through a column, as illustrated in FIG. 1.

FIG. 10 presents comparative bar plot showing the effect of alternating consecutive pH bed washes (pH=12.6 and pH=5.8) on the ethanol flow speed through an LDH bed at various bed heights 1.6, 1.9, and 2.1 cm (max. SD is $6 \times 10^{-4}$ cm/s).

Figure 11:
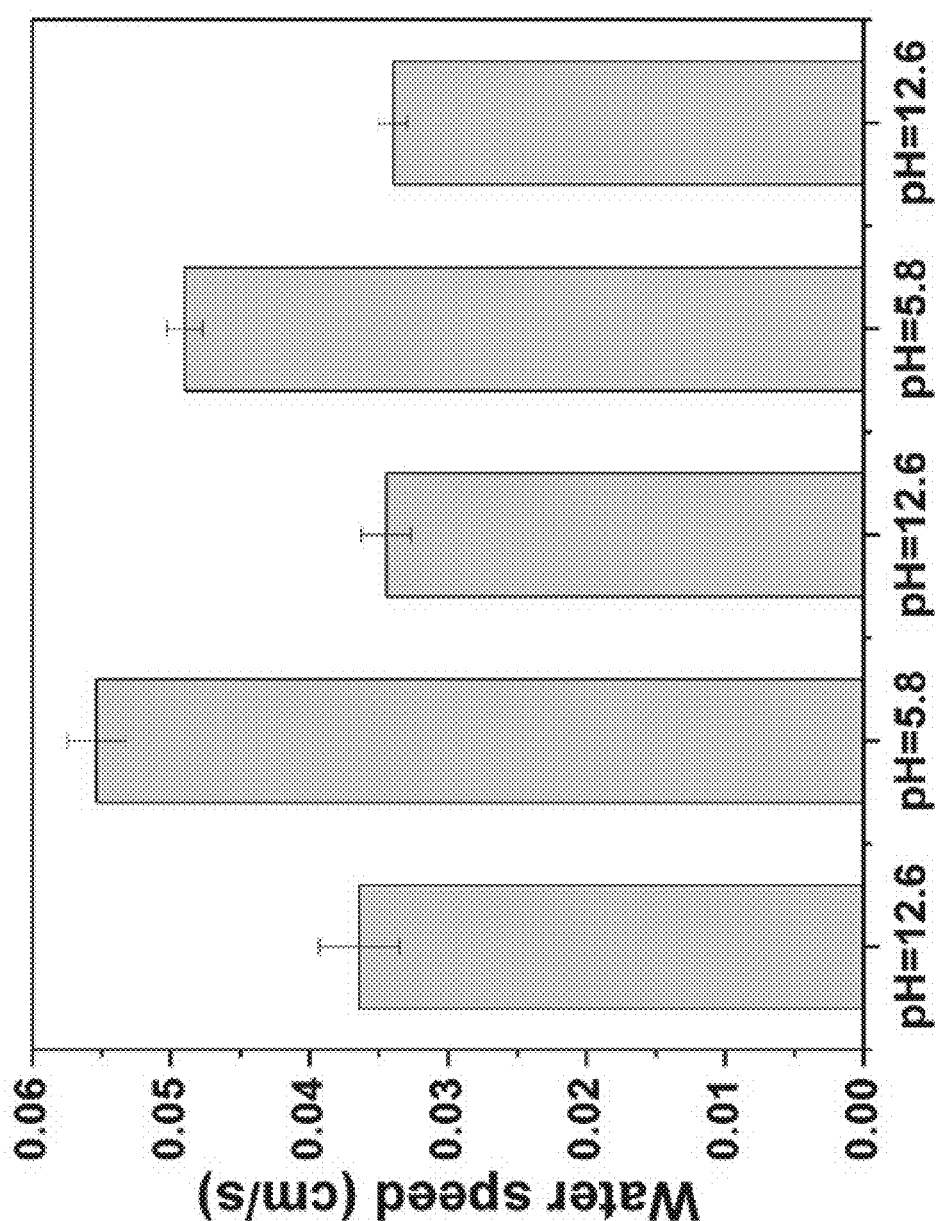
FIG. 11 shows the MilliQ water flow speed through LDH bed washed following alternating pH bed washes, wherein each point was measured in triplicates.

FIG. 11 shows the MilliQ water flow speed through LDH bed washed following alternating pH bed washes, wherein each point was measured in triplicates.

The reversibility of the coagulation process was tested by alternatingly washing the same column with a pH=12.6 solution (above PZC) and a pH=5.8 solution (below PZC). Prior to measurement, the column was equilibrated for 3 minutes in a base or an acid solution before draining. The short equilibration time was selected based on the results shown in FIG. 9, which show that a wash with a solution below PZC did not affect the flow speed between 3 and 100 min. However, it was observed that a wash of the colloidal bed for 100 min with a pH greater than the PZC resulted in water flow speed lower as compared to the washing for only 3 minutes.

Performing the alternating flow velocity measurements using EtOH allowed avoiding changes to surface pH, which may arise when water with neutral pH is passed through the column. It can be seen that following a wash of the column with a pH of 12.6 solution (above the PZC) the EtOH flow speed was slower than the speed after the same column was washed with a pH 5.8 solution. Alternating the pH washes between pH levels of 12.6 and 5.8 for 3 times showed that the process is reversible and that the flow is consistently faster following wash of the colloidal bed with a solution of pH 5.8. A similar trend for the relation between the alternating pH level washes, of the same column, and the average rate of milliQ water was also identified (see FIG. 11).

The results shown are consistent with the coagulation properties of the LDH particles as discussed above. Regardless of the height of the LDH bed, the measured EtOH flow speed is consistently slower when the particles are in the aggregated state (following a wash with a pH solution above the PZC and faster when the particles are dispersed (below PZC). This finding indicates that the difference in flow through the gate is due to the arrangement of the particles in the aggregate, as evidenced by the cryo-TEM images.

Figure 12:
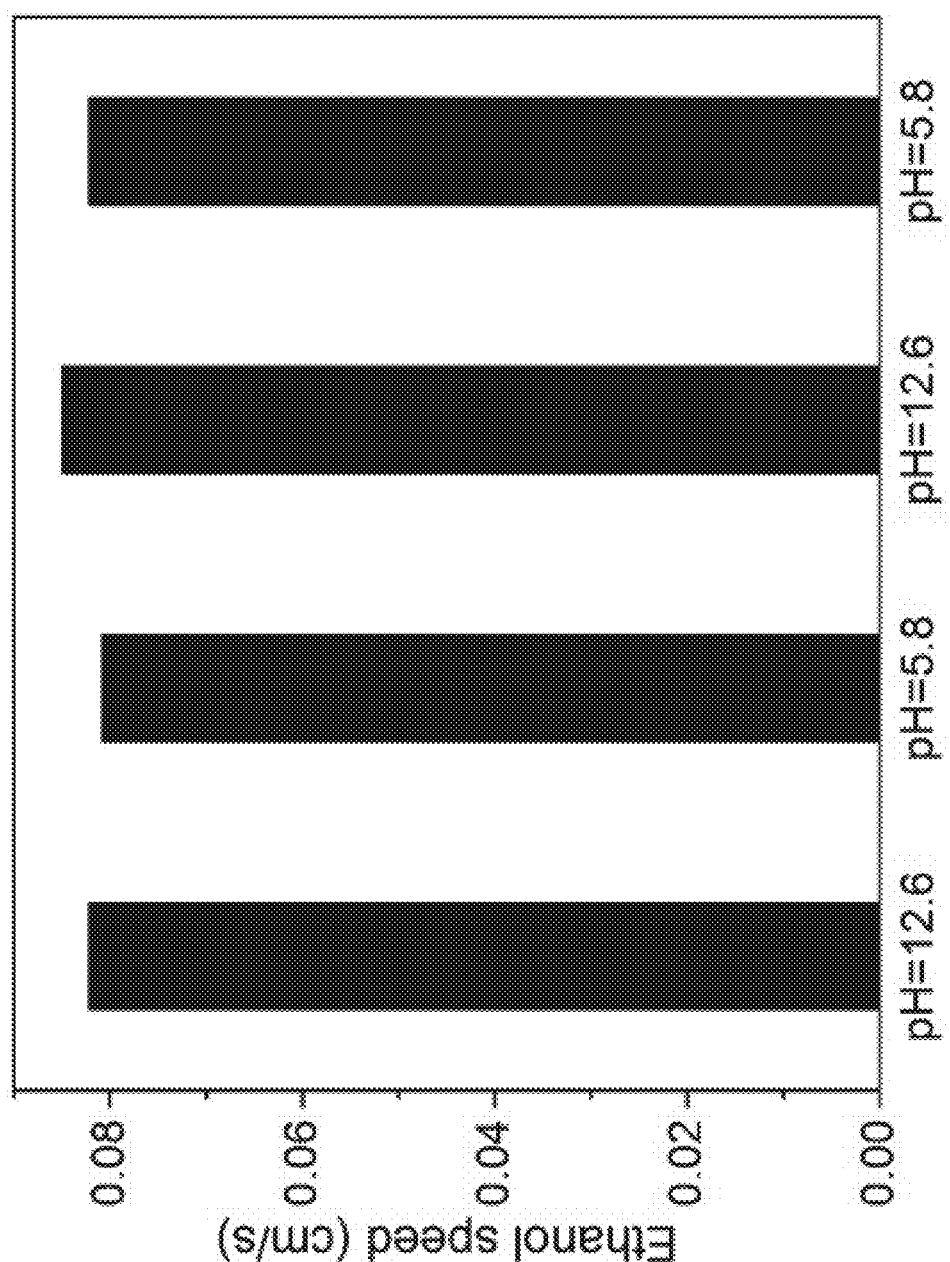
FIG. 12 shown the effect of alternating pH bed washes (pH=12.6 and pH=5.8) on the ethanol flow speed through an all-quartz system flow test (L=1.1 cm)(max. SD is 6×10−4 cm/s)

To examine the effect of the quartz particles, the flow experiment in which pH values are alternated, was performed using a column with a bed composed of isotropic quartz particles only, as shown in FIG. 12.

FIG. 12 shown the effect of alternating pH bed washes (pH=12.6 and pH=5.8) on the ethanol flow speed through an all-quartz system flow test (L=1.1 cm)(max. SD is $6 \times 10^{-4}$ cm/s).

As can be seen in FIG. 12, alternating the pH washes between 12.6 and 5.8 did not have any effect on the flow velocity through the column. This indicates that the quartz fraction in the LDH column (see, FIG. 1) does not affect the flow through the column. Presumably, it is the edge-to-edge self-assembly of the LDH, as evidenced in the Cryo-TEM above, which plays a pivotal role in governing the structure of the aggregates and in turn the mass transport through the column. Interestingly, the EtOH flow speed as a function of the increase in bed length was found to decrease in a more logarithmic manner in the all-quartz column while in the LDH system the decay was more linear (see, FIG. 13). This observation indicates that under similar gravitational pressure gradients the all-quartz bed behaved more like a compressible particle bed whereas the LDH system was consistent with the behavior of an incompressible bed. Presumably, this difference is related to the difference between the spherical geometry in the former as compared to the 2D plate-like geometry of the latter.

Figure 13:
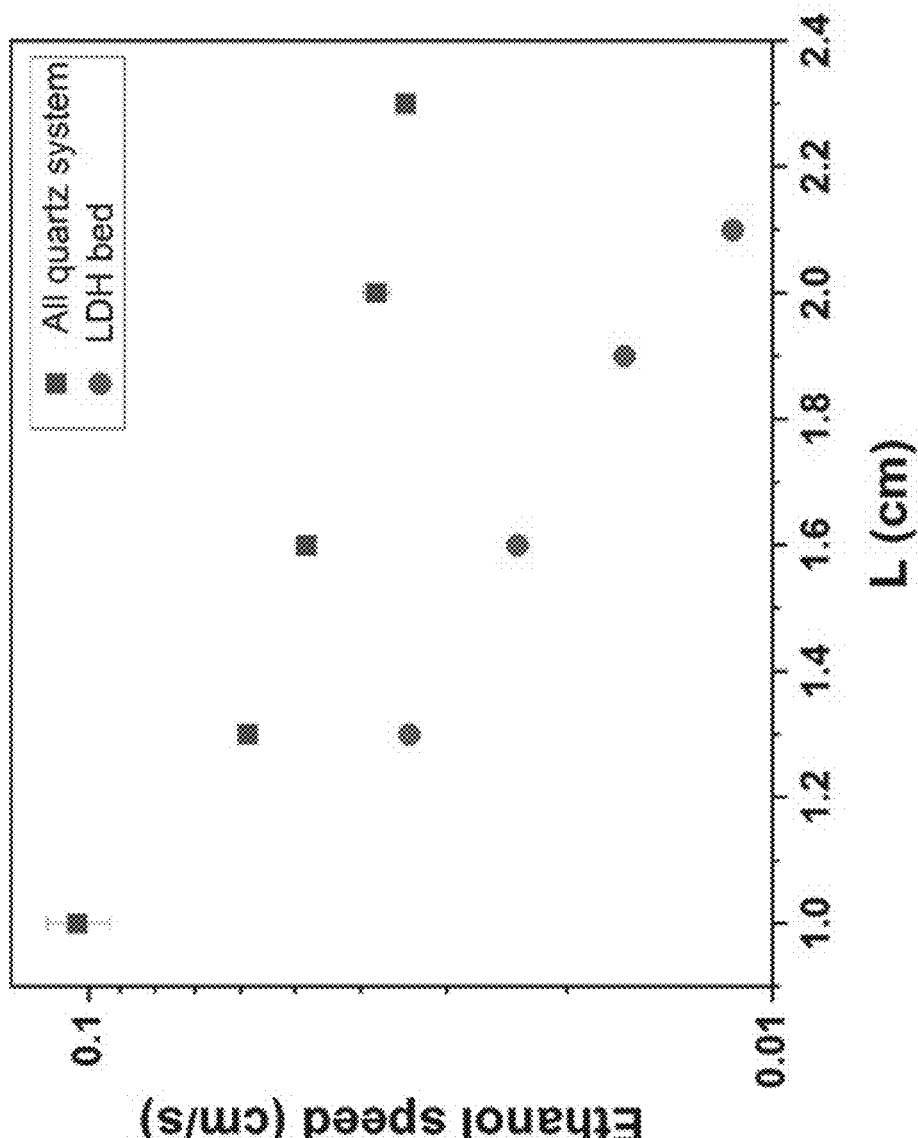
FIG. 13 shows ethanol flow speed as a function of bed size, wherein each point was measured in triplicates and the error bars are included (error bar may be too small to be noticeable)

FIG. 13 shows ethanol flow speed as a function of bed size, wherein each point was measured in triplicates and the error bars are included (error bar may be too small to be noticeable).

Figure 14A:
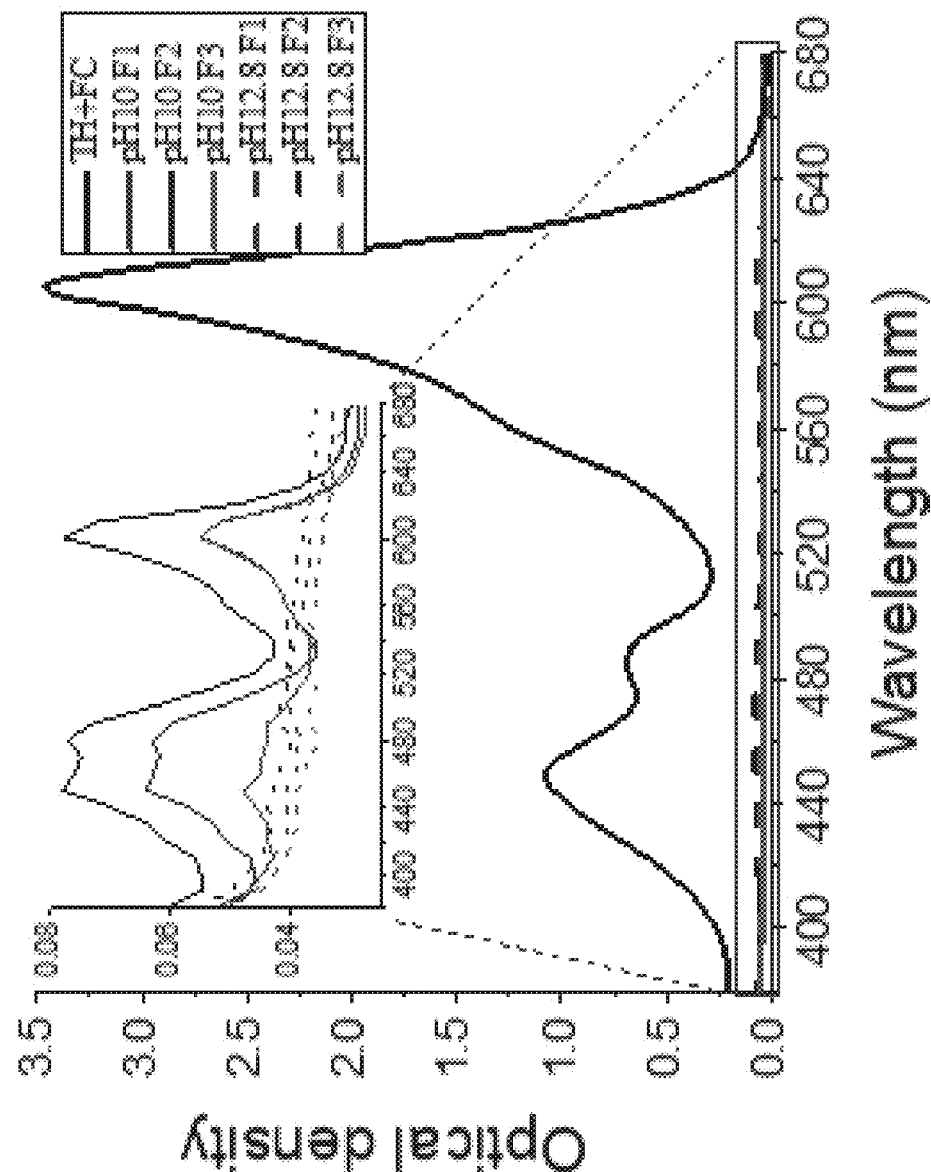
Figures 14B, 14C:
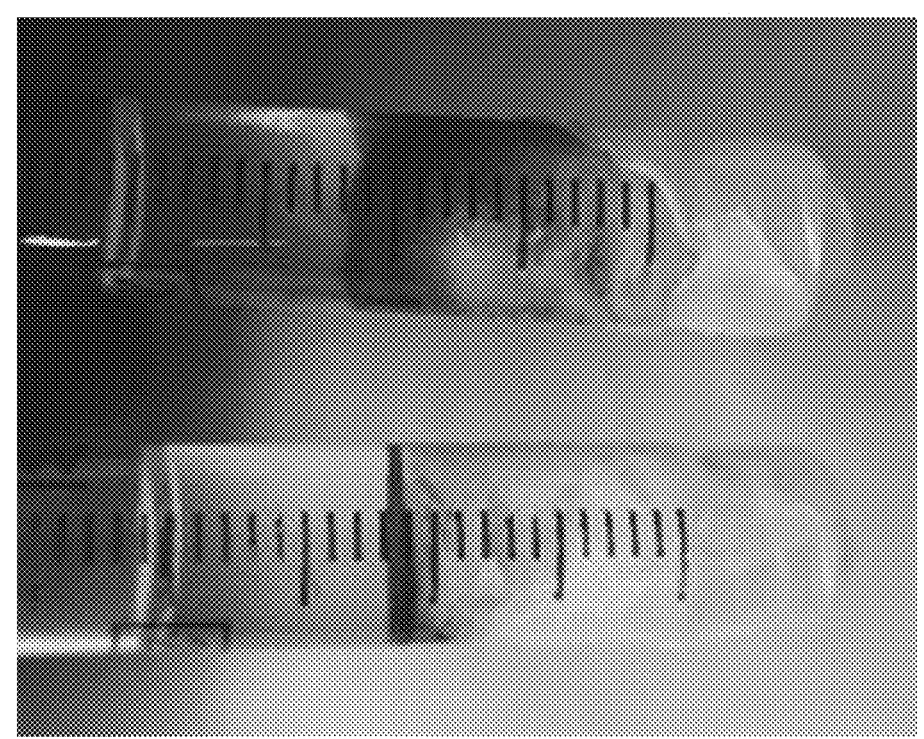

The inventors further examined the effect of the pH wash value on the flow through the column of a mixed solution of thionine (TH) and fluorescein (FC) in EtOH (see, FIG. 14C).

FIGS. 14A-C present various characterizations of pH-controlled dye elution, wherein FIG. 14A shows the absorbance spectra ethanol eluted mixed solution of fluorescein (FC) and thionine (TH), FIG. 14B shows the cumulative fraction of FC and TH as a function of elution fraction, and FIG. 14C is a color photograph of columns pH and pH 12.8 showing the difference in flow of the dyes through the column.

It was found that for larger molecules such FC and TH, as compared to $H_2O$ and EtOH, the column was in a "closed gate" state following a wash with a pH 12.8 and in an "open gate" state following a wash with a pH 10. However, the inventors observed greater mobility of FC in the "open gate" state (pH 10) relatively to the mobility of TH (see, FIG. 14B). The cumulative quantity of FC, following 3 washes with EtOH, amounted to about 13% of the initial FC concentration. At the same time only about 2% of the initial TH concentration was recovered, which gives a selectivity of TH:FC in the ratio 2:6.

Example 7 pH Sensitive Flow-Gate for Nutrient Introduction into Soil

The device described is a flow-gate, based on colloidal particles according to some embodiments of the present disclosure, which opens and closed based on an external stimulus (trigger) such as pH change. The gate may be fully open/fully close or partially open. The gate body comprises a semi-permeable wall, which can allow it to be sensitive to environment conditions i.e., pH change in wet soil. The gate body contains colloidal particles such as clay or clay-like nanoparticles or a mixture thereof or other. The colloidal particles may have an organically modified surface to allow gate triggering by i.e., presence of hydrophobic molecules or other specific molecules.

The gate can be connected in serial or parallel to allow passage of the main flow in a continuous or batch modes.

Figure 15:
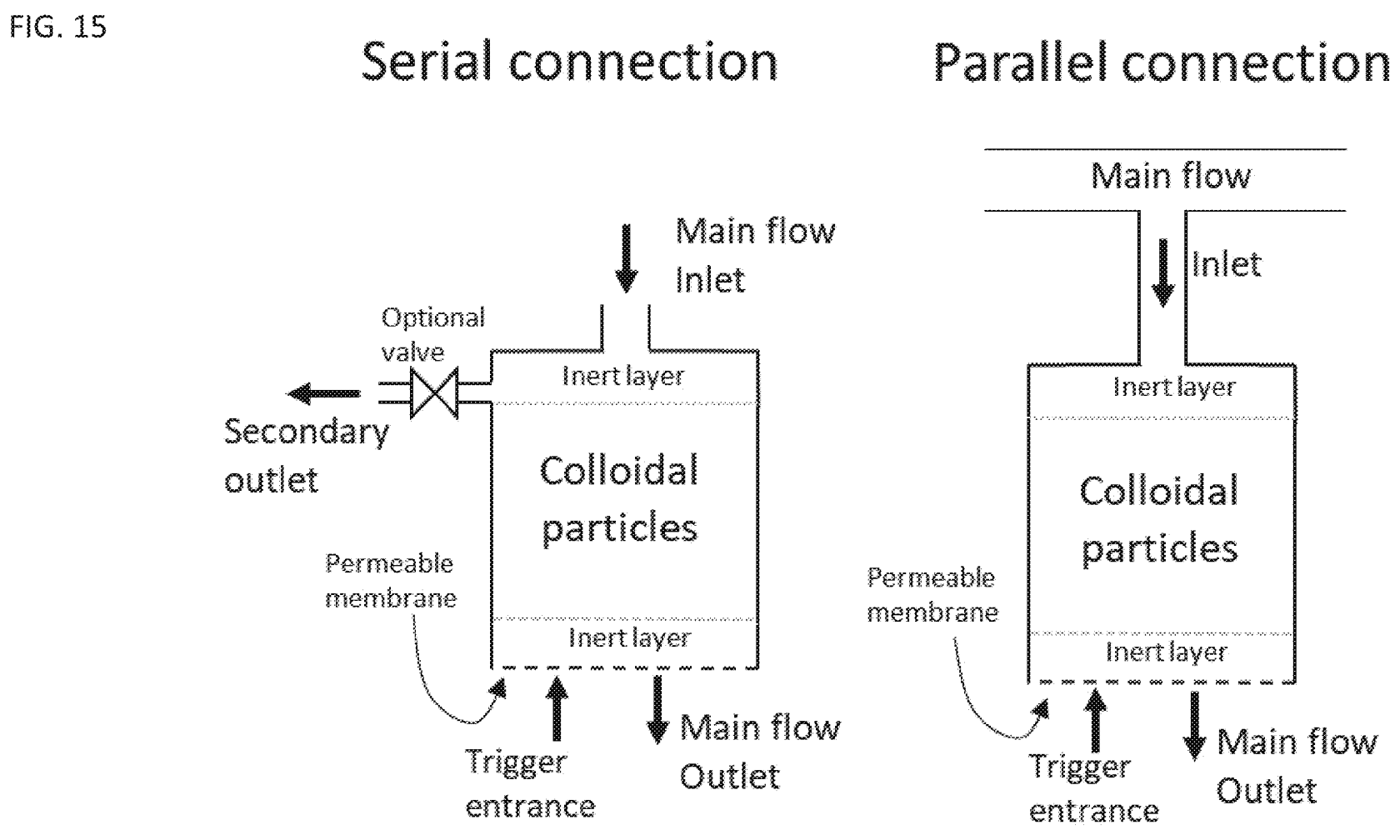

FIG. 15 presents a schematic illustration of a device comprising a flow-gate based on colloidal particles according to some embodiments of the present disclosure, which opens and closed a through-flow based on an external stimulus (trigger) such as pH change. The device comprises a flow-chamber in the exemplary form of a vertical open-top polymeric column. The chamber contains a bed of chemo-responsive colloidal particles and is closed on both side by a flow-permeable layers which may be comprised of quartz wool and quartz particles. The flow-permeable layer allow for the through-flow of an aqueous solution through the flow-chamber, while confining the chemo-responsive colloidal particles to the flow-chamber. When in the "open" state, the non-aggregated colloidal particles allow for flow through the flow-chamber and through the two flow-permeable layers that flank the flow-chamber and stop particle transport on both sides of the flow-chamber. Once the particles coagulate ("closed" state), the aggregates form a plug near the flow-permeable layer close to the outlet of the flow-gate, thereby arresting or reducing the flow through the flow-gate.

Example 8

Suspended Flow Inline pH Triggered Flow-Gate

The device described is a colloidal gate positioned inline that opens and closes based on a specific property (trigger) of the flown liquid such as pH change (see, FIGS. 16A-D below). The gate may be fully open/fully close or partially open. The gate body contains colloidal particles such as clay or clay-like nanoparticles or a mixture thereof or other. The colloidal particles may have an organically modified surface to allow gate triggering by i.e., presence of hydrophobic molecules or other specific molecules.

FIGS. 16A-D present schematic illustrations of a few exemplary devices, according to some embodiments of the present invention, each comprising a flow-gate positioned inline that opens and closed based on a specific property (trigger) of the flown liquid such as pH change. The devices in FIGS. 16A-B differ from one-another in the orientation of the outlet, showing the versatility in the design options, and the devices shown in FIGS. 16C-D further include a secondary outlet for pressure discharge.

The devices may comprise a semi-permeable membrane, constructed from either organic or inorganic materials, serving as the semi-permeable opening. This membrane functions to permit the colloidal particles in the flow-chamber to be exposed to external conditions while preventing the leakage thereof from the device. The primary flow through the device is oriented in a top-down direction and is regulated by the state/activity of the colloidal particles. The device operates in an analog fashion and does not necessitate connection to an external power source or additional sensors.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A flow system comprising at least one flow-gate, wherein:

said flow-gate comprises at least one flow-chamber, and a colloid of chemo-responsive colloidal particles contained in said flow-chamber;

said chemo-responsive colloidal particles are characterized by having a Brucite-like structure, and by forming fluid-impermeable aggregates in response to a change in a concentration of at least one solute in said colloid;

said chemo-responsive colloidal particles comprises ionic-responsive colloidal particles, and the system is configured to allow a flow of a fluid exhibiting at least an ionic strength at which aggregates of said ionic-responsive colloidal particles disassemble.

2. The system of claim 1, wherein said chemo-responsive colloidal particles comprises pH-responsive colloidal particles, and the system is configured to allow a flow of a fluid exhibiting at least a pH level at which aggregates of said pH-responsive colloidal particles disassemble.

3. The system of claim 2, wherein said chemo-responsive colloidal particles are characterized by having a general formula I:

$$\left[M_{(1-x)}^{2+}M_x^{3+}(OH)_2\right]^{x+}[A^{n-}]_{x/n} \qquad \text{Formula I}$$

wherein:

$M^{2+}$ is a divalent metal ion, $M^{3+}$ is a trivalent metal ion, x is a molar ratio $$\frac{M^{2+}}{\left(M^{2+}+M^{3+}\right)}$$

raging 0.2-0.33, $A^{n-}$ is an interlayer anion, and n is an integer ranging 1-3.

4. The system of claim 3, wherein $M^{2+}$ is selected from the group consisting of $Mg^{2+}$, $Cd^{2+}$, $Co^{2+}$, $Cr^{2+}$, $Cu^{2+}$, $Fe^{2+}$, $Hg^{2+}$, $Mn^{2+}$, $Ni^{2+}$, $Pb^{2+}$, and $Zn^{2+}$.

5. The system of claim 3, wherein $M^{3+}$ is selected from the group consisting of $Al^{3+}$, $Cr^{3+}$, $Dy^{3+}$, $Er^{3+}$, $Eu^{3+}$, $Fe^{3+}$, $Gd^{3+}$, $Ho^{3+}$, $La^{3+}$, $Lu^{3+}$, $Mn^{3+}$, $Nd^{3+}$, $Pr^{3+}$, $Sc^{3+}$, $Sm^{3+}$, $Tb^{3+}$, $Tm^{3+}$, $Y^{3+}$, and $Yb^{3+}$.

6. The system of claim 3, wherein $A^{n-}$ is selected from the group consisting of a halide ion, $OH^-$, $NO_3^-$, $NO_2^-$, $CO_3^{2-}$, $SO_4^{2-}$, $SO_3^{2-}$ and $PO_4^{3-}$.

7. The system of claim 1, wherein an average size of said chemo-responsive colloidal particles ranges 0.1-1000 μm.

8. The system of claim 1, wherein said chemo-responsive colloidal particles exhibit a broad particle size distribution, said broad particle size distribution is characterized by a particle size range that spans at least two orders of magnitude, and less than 30% of a total particle population in any particle size bin.

9. The system of claim 1, wherein said at least one flow-gate comprises at least one flow-permeable barrier positioned between said flow-chamber and said outlet.

10. The system of claim 1, wherein an amount of said chemo-responsive colloidal particles ranges at least 0.1-1 grams per 1 $cm^2$ of cross-sectional area of said flow-chamber.

11. The system of claim 1, wherein said flow-chamber further comprises a semi-permeable opening in communication with said colloid and with an aqueous medium in an environment outside the flow-gate, wherein said semi-permeable opening is impervious to said chemo-responsive colloidal particles and permeable to at least one solute in said aqueous medium.

12. The system of claim 1, wherein said solute is selected from the group consisting of hydronium ion (a hydrated proton), a monovalent cation, a divalent cation, a trivalent cation, a monovalent anion, a divalent anion, a trivalent anion, and any combination thereof.

13. The system of claim 1, wherein said chemo-responsive colloidal particles are pH-responsive colloidal particles.

14. The system of claim 1, wherein said chemo-responsive colloidal particles are ionic-responsive colloidal particles.

15. A flow system comprising at least one flow-gate, wherein:

said at least one flow-gate comprises at least one flow-chamber, and a colloid of chemo-responsive colloidal particles contained in said flow-chamber;

said chemo-responsive colloidal particles are characterized by having a Brucite-like structure, and by forming fluid-impermeable aggregates in response to a change in a concentration of at least one solute in said colloid;

said flow-chamber further comprises a semi-permeable opening in communication with said colloid and with an aqueous medium in an environment outside the flow-gate;

said semi-permeable opening is impervious to said chemo-responsive colloidal particles and permeable to at least one solute in said aqueous medium;

said chemo-responsive colloidal particles comprises ionic-responsive colloidal particles;

the system is configured to allow a flow therethrough upon a change in an ionic strength level in said aqueous medium in said environment; and said ionic strength level in said aqueous medium is at least an ionic strength at which aggregates of said ionic-responsive colloidal particles disassemble.

* * * * *